United States Patent
Kashiwagura et al.

(10) Patent No.: US 6,935,302 B2
(45) Date of Patent: Aug. 30, 2005

(54) IN-CYLINDER INJECTION TYPE INTERNAL COMBUSTION ENGINE

(75) Inventors: Toshimi Kashiwagura, Susono (JP); Masaharu Ichise, Susono (JP); Mutsumi Kanda, Susono (JP); Takashi Hashima, Gotenba (JP); Hiroshi Nomura, Gotenba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 30 days.

(21) Appl. No.: 10/355,959

(22) Filed: Feb. 3, 2003

(65) Prior Publication Data

US 2003/0164151 A1 Sep. 4, 2003

(30) Foreign Application Priority Data

Mar. 4, 2002 (JP) ......................................... 2002-057128

(51) Int. Cl.⁷ ................................................ F02B 17/00
(52) U.S. Cl. ......................... 123/295; 123/305; 123/310
(58) Field of Search ................................ 123/295, 301, 123/305, 310, 309, 302

(56) References Cited

U.S. PATENT DOCUMENTS

| | | | | |
|---|---|---|---|---|
| 4,287,862 A | * | 9/1981 | Noguchi et al. | 123/310 |
| 4,296,720 A | * | 10/1981 | Nakanishi et al. | 123/309 |
| 4,421,081 A | * | 12/1983 | Nakamura et al. | 123/310 |
| 4,964,379 A | * | 10/1990 | August | 123/51 B |
| 5,261,367 A | * | 11/1993 | Yamamoto et al. | 123/309 |
| 5,408,968 A | * | 4/1995 | Yamamoto et al. | 123/309 |
| 5,954,024 A | * | 9/1999 | Duhr et al. | 123/310 |
| 6,035,824 A | * | 3/2000 | Lee | 123/295 |
| 6,095,114 A | * | 8/2000 | Horie et al. | 123/298 |
| 6,659,070 B2 | * | 12/2003 | Sebastian et al. | 123/298 |

FOREIGN PATENT DOCUMENTS

| | | |
|---|---|---|
| JP | U 62-183077 | 11/1987 |
| JP | A 4-81577 | 3/1992 |
| JP | A 8-246878 | 9/1996 |
| JP | A 2000-291438 | 10/2000 |

\* cited by examiner

*Primary Examiner*—John T. Kwon
(74) *Attorney, Agent, or Firm*—Oliff & Berridge, PLC

(57) ABSTRACT

An in-cylinder injection type internal combustion engine is provided, which first fires a first spark plug and thereafter fires a second spark plug when a required load is low and which first fires the second spark plug and thereafter fires the first spark plug when the required load is high.

11 Claims, 16 Drawing Sheets

F I G. 15
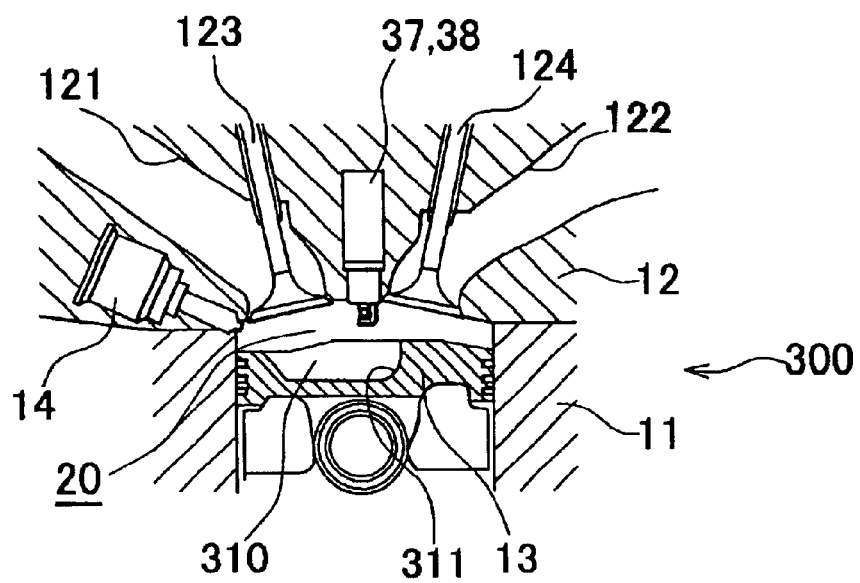
F I G. 16
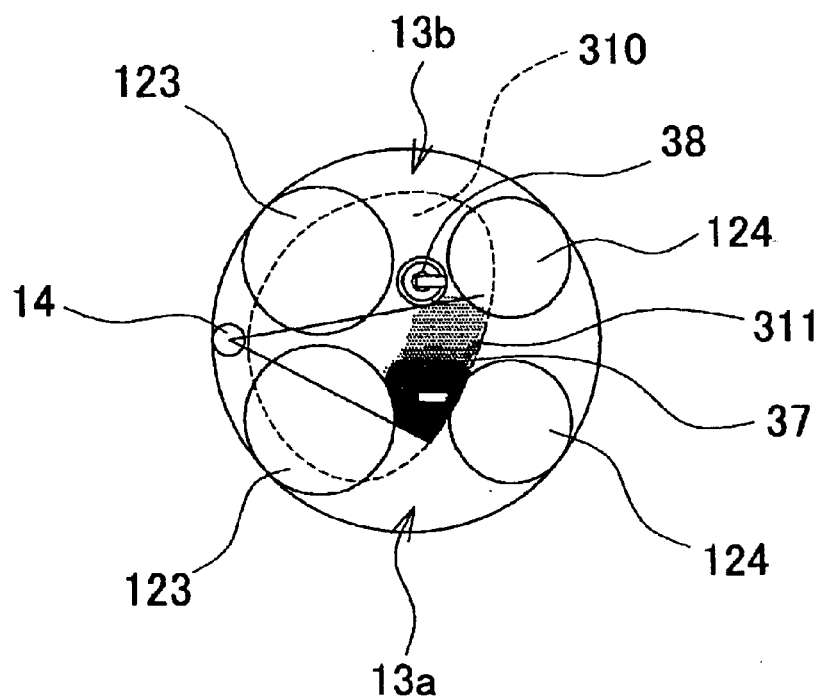

F I G. 22
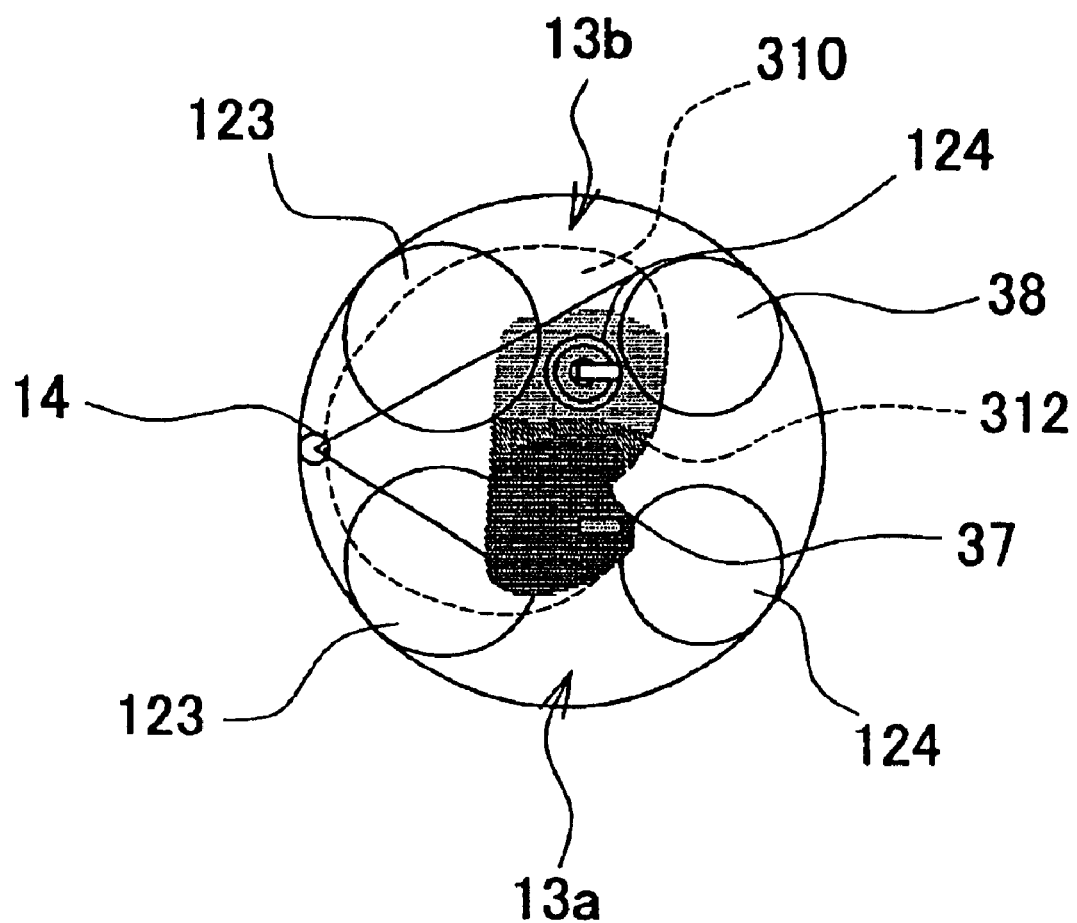

IN-CYLINDER INJECTION TYPE INTERNAL COMBUSTION ENGINE

INCORPORATION BY REFERENCE

The disclosure of Japanese Patent Application No. 2002-057128 filed on Mar. 4, 2002, including the specification, drawings and abstract is incorporated herein by reference in its entirety.

BACKGROUND OF THE INVENTION

1. Field of Invention

The invention relates to an in-cylinder fuel injection type internal combustion engine which directly injects fuel into each cylinder, and more particularly to an ignition timing control of such an in-cylinder fuel injection type internal combustion engine.

2. Description of Related Art

In conventional port injection type internal combustion engines, fuel is first injected into a port in the form of a spray, and the fuel spray is then introduced into each combustion chamber during an intake stroke. Thus, the air-fuel mixture is evenly distributed in the combustion chamber and thereafter is ignited by a spark plug, namely so-called "homogeneous-charge combustion" is performed. In this case, the ignition of the air-fuel mixture does not largely depend on the position of the spark plug. During homogeneous-charge combustion, however, since the air-fuel mixture concentration is made almost constant in the entire area of the combustion chamber, the rarefaction of an air-fuel mixture is limited. To counter this, an in-cylinder fuel injection type internal combustion engine (hereinafter will be simply referred to as "a direct injection engine" where appropriate) which directly injects fuel into cylinders (combustion chambers) has recently been put into practical use. Having a capability of supplying (injecting) fuel into a combustion chamber at a desired time, in general, a direct injection engine performs so-called "stratified-charge combustion" where fuel is injected in a latter half of each compression stroke so that an air-fuel mixture having combustible concentration is produced around the spark plug, thus performing a so-called "lean burn engine operation."

During the stratified-charge combustion, however, since the air-fuel mixture having a combustible concentration is produced only around the spark plug, the air-fuel ratio in the entire area of the combustion chamber tends to become much lower than the stoichiometric air-fuel ratio, which limits an ignitable region of the air-fuel mixture in the combustion chamber. In particular, it is difficult to create a region of an air-fuel mixture which is appropriate both when the load required of the engine is low and when the same load is high (Hereinafter, an engine operation performed when the load required of the engine is low will be referred to as "a low load engine operation", and an engine operation performed when the same load is high will be referred to as "a high load engine operation" where appropriate). For example, since only a small amount of fuel is injected and a combustible region of an air-fuel mixture is therefore narrow during the low load engine operation, it is necessary to produce the air-fuel mixture around the spark plug. During the high load engine operation, conversely, a large amount of fuel is injected. Here, if the same ignition timing as that used during the low load engine operation is used, the spark plug ignites an air-fuel mixture having an excessively high concentration produced in the vicinity thereof, which results in a reduction in the combustion efficiency. Also, in the case where the direct engine is adapted to ignite the air-fuel mixture after it has been sufficiently dispersed within the combustion chamber during the high load engine operation, it may happen that the ignitable region of the air-fuel mixture has already moved away from the spark plug before the ignition time, and the ignition of the air-fuel mixture therefore may fail.

Also, when stratified-charge combustion is performed, a sufficient stability in combusting air-fuel mixtures may not be achieved owing to variations in the concentration of an air-fuel mixture among different regions of the combustion chamber. In consideration of these facts, presently, during the low load engine operation, stratified-charge combustion is performed by producing an air-fuel mixture and timing the ignition of the air-fuel mixture in a manner mainly suitable for the low load engine operation. During the high load engine operation, conversely, partial stratified-charge combustion or homogenous-charge combustion is performed.

Accordingly, it is significantly desirable that stratified-charge combustion be extensively performed during both low-load and high-load engine operations. Especially, the fuel economy improves if stratified-charge combustion can be performed also during high-load engine operations.

SUMMARY OF THE INVENTION

In view of the above problems, the invention has been made to provide an in-cylinder injection type internal combustion engine which permits an expansion of a stratified-charge combustion region and achieves a stable combustion of air-fuel mixtures during stratified-charge combustion.

To achieve this object, an in-cylinder injection type internal combustion engine according to a first aspect of the invention includes a cylinder block, a cylinder head, a piston; a combustion chamber defined by the cylinder block, the cylinder head, and the piston; a fuel injector for injecting a fuel directly into the combustion chamber, which injects the fuel such that high and low concentration portions of an air-fuel mixture are formed in the combustion chamber during stratified-charge combustion; a plurality of ignitors arranged within the cylinder head with respect to the high and low concentration portions of the air-fuel mixture respectively; a load detector for detecting a load required of the in-cylinder injection type internal combustion engine; and an ignition controller which advances an ignition time of the ignitor arranged with respect to the high concentration portion of the air fuel mixture than an ignition time of the ignitor arranged with respect to the low concentration portion of the air-fuel mixture when a load detected by the load detector is low during stratified-charge combustion.

According to this construction, the plurality of ignitors are arranged with respect to the high and low concentration portions of the air-fuel mixture, and the ignition time of the ignitor arranged with respect to the high concentration portion of the air-fuel mixture is advanced than the ignition time of the ignitor arranged with respect to the low concentration portion of the air-fuel mixture when the required load is low during stratified-charge combustion. Thus, a region of an air-fuel mixture having a high concentration is ignited and a complementary ignition of the air-fuel mixture is performed so that a further stability can be achieved in igniting air-fuel mixtures during stratified-charge combustion.

In the in-cylinder injection type internal combustion engine according to the first aspect of the invention, it is preferable that the ignition controller delays the ignition time of the ignitor arranged with respect to the high concentration portion of the air fuel mixture than the ignition time of the ignitor arranged with respect to the low concentration portion of the air-fuel mixture when the load detected by the load detector is high during stratified-charge combustion. When the load required of the engine is high during stratified-charge combustion, the low concentration portion of the air-fuel mixture may be sufficiently ignitable while the high concentration portion may be too rich. With the above arrangement, therefore, the low concentration portion which is sufficiently ignitable is first ignited by the ignitor arranged with respect to the low concentration portion, and the high concentration portion which has sufficiently dispersed and thus has reduced concentration is then ignited by the ignitor arranged with respect to the high concentration portion. As a result, the stratified-charge combustion region can be expanded.

In the in-cylinder injection type internal combustion engine according to the first aspect of the invention, it is also preferable that the plurality of ignitors are a first ignitor arranged within the cylinder head with respect to the high concentration portion of the air fuel mixture formed in the combustion chamber and a second ignitor arranged within the cylinder head with respect to the low concentration portion of the air fuel mixture formed in the combustion chamber and the ignition controller advances the ignition time of the first ignitor than the ignition time of the second ignitor when the load detected by the load detector is low during stratified-charge combustion.

According to this construction, with the first ignitor arranged with respect to the high concentration portion of the air-fuel mixture and the second ignitor arranged with respect to the low concentration portion of the air fuel mixture, the ignition controller advances the ignition time of the first ignitor than the ignition time of the second ignitor when the required load is low during stratified-charge combustion. Thus, a region of an air-fuel mixture having a high concentration is ignited and a complementary ignition of the air-fuel mixture is performed so that a further stability can be achieved in igniting air-fuel mixtures during stratified-charge combustion.

In the in-cylinder injection type internal combustion engine according to the first aspect of the invention, it is also preferable that the ignition controller delays the ignition time of the first ignitor than the ignition time of the second ignitor when the load detected by the load detector is high during stratified-charge combustion. When the required load is high during stratified-charge combustion, the low concentration portion of the air-fuel mixture may become sufficiently ignitable while the high concentration portion may become too rich with an increase in the amount of the injected fuel. With the above arrangement, therefore, the second ignitor is ignited before the first ignitor in such a case. Namely, the low concentration portion which has become sufficiently ignitable is first ignited by the second ignitor and the high concentration portion which has sufficiently dispersed and thus has reduced concentration is then ignited by the first ignitor. As a result, the stratified-charge combustion region can be expanded.

In the in-cylinder injection type internal combustion engine according to the first aspect of the invention, it is also preferable that the fuel injector be disposed at a periphery of the combustion chamber and be adapted to inject fuel towards a central area of the combustion chamber from the periphery of the combustion chamber such that the high concentration portion of the air-fuel mixture is formed in the central area of the combustion chamber and the low concentration portion of the air-fuel mixture is formed in a peripheral area of the combustion chamber immediately after the fuel has been injected. In addition, it is also preferable that the first ignitor is disposed in a portion of the cylinder head corresponding to the central area of the combustion chamber; and the second ignitor is disposed in a portion of the cylinder head corresponding to the peripheral area of the combustion chamber. According to this construction, the high concentration portion of the air-fuel mixture formed in the central area of the combustion chamber is first ignited by the first ignitor when the required load is low, while the low concentration portion of the air-fuel mixture which is ignitable and is formed in the peripheral area of the combustion chamber is first ignited by the second ignitor when the required load is high.

In the in-cylinder injection type internal combustion engine according to the first aspect of the invention, it is also preferable that the combustion chamber has a shape suitable for guiding the air fuel mixture formed of the fuel injected by the fuel injector and moving from the peripheral area to the central area of the combustion chamber to flow from the central area to the peripheral area of the combustion chamber along the cylinder head and the first and second ignitors are arranged within the cylinder head so as to be located in line with the flow of the air-fuel mixture. According to this construction, an air-fuel mixture is guided to move along the first and second ignitors. Thus, when the required load is low, the first ignitor is fired to ignite the air-fuel mixture of a high concentration before it disperses, and the second ignitor is fired to ignite the same air-fuel mixture even if it fails to be ignited by the first ignitor. When the required load is high, conversely, an air-fuel mixture which has sufficiently dispersed and thus has reduced concentration is ignited by the first ignitor. In this way, the stratified-charge combustion region can be expanded.

In the in-cylinder injection type internal combustion engine according to the first aspect of the invention, it is also preferable that the piston includes a cavity formed on an upper surface of the piston for guiding the air-fuel mixture formed of the fuel injected from the fuel injector and moving from the peripheral area to the central area of the combustion chamber to flow from the peripheral area to the central area of the combustion chamber along the cylinder head, and the fuel injector is disposed at the periphery of the combustion chamber and is adapted to inject fuel towards the cavity of the piston, and the first ignitor is disposed in a portion of the cylinder head facing the cavity of the piston while the second ignitor is disposed in a portion of the cylinder head that is located in the vicinity of the fuel injector. According to this construction, an air-fuel mixture is guided from the central area to the peripheral area of the combustion chamber. Thus, the above-described effects and advantages can be achieved.

Next, an in-cylinder injection type internal combustion engine according to a second aspect of the invention includes a cylinder block; a cylinder head; a piston; a combustion chamber defined by the cylinder block, the cylinder head, and the piston; a fuel injector for injecting fuel directly into the combustion chamber, which is disposed at a periphery of the combustion chamber and is adapted to inject the fuel such that high and low concentration portions of an air-fuel mixture are formed in the combustion chamber during stratified-charge combustion; a cavity that is formed on an upper surface of the piston and guides the air-fuel mixture formed of the fuel injected from the fuel injector and moving from a peripheral area to a central area of the combustion chamber to flow from the peripheral area to the central area of the combustion chamber along the cylinder head; a first ignitor disposed in a portion of the cylinder head facing the cavity; a second ignitor disposed in a portion of the cylinder head that is located in the vicinity of the fuel injector; and an ignition controller that is adapted to fire the first and second ignitors at the same time.

According to this construction, even when an air-fuel mixture moving from the central area to the peripheral area of the combustion chamber is separated into two air-fuel mixtures in the central and peripheral areas of the combustion chamber, those mixtures can be respectively ignited by the first ignitor disposed in the portion of the cylinder head facing the cavity and the second ignitor disposed in the portion of the cylinder head located in the vicinity of the fuel injector. Thus, a further stability can be achieved in igniting air-fuel mixtures during stratified-charge combustion.

Next, an in-cylinder injection type internal combustion engine according to a third aspect of the invention includes a cylinder block; a cylinder head; a piston; a combustion chamber defined by the cylinder block, the cylinder head, and the piston; a fuel injector for injecting fuel directly into the combustion chamber, which injects the fuel such that high and low concentration portions of an air-fuel mixture are formed in the combustion chamber during stratified-charge combustion; and a plurality of ignitors, each having a different length of a portion protruded out from the cylinder head.

According to this construction, air fuel mixtures formed at various distances from the cylinder head can be ignited.

In the in-cylinder injection type internal combustion engine according to the third aspect of the invention, it is preferable that the plurality of ignitors are a first ignitor, a portion of which protruded out from the cylinder head has a short length and a second ignitor, a portion of which protruded out from the cylinder head has a length longer than the length of the portion of the first ignitor, and the in-cylinder injection type internal combustion engine further includes an engine speed detector for detecting an engine speed of the in-cylinder injection type internal combustion engine and an ignition controller which fires the first ignitor when the engine speed detected by the engine speed detector is low and fires the second ignitor when the engine speed detected by the engine speed detector is high during stratified-charge combustion.

According to this construction, the first ignitor, the portion of which protruded out from the cylinder head has a short length, is fired to ignite an air-fuel mixture formed at a short distance from the cylinder head when the engine speed is low, while the second ignitor, the portion of which protruded out from the cylinder head has a long length, is fired to ignite an air-fuel mixture formed at a long distance from the cylinder head when the engine speed is high. Accordingly, the stratified-charge combustion region can be expanded, and a further stability can be achieved in igniting air-fuel mixtures during stratified-charge combustion.

Next, an in-cylinder injection type internal combustion engine according to a fourth aspect of the invention includes a cylinder block; a cylinder head; a piston; a combustion chamber defined by the cylinder block, the cylinder head, and the piston; a fuel injector for injecting fuel directly towards a central area of the combustion chamber, which injects the fuel such that high and low concentration portions of an air-fuel mixture are formed in the combustion chamber during stratified-charge combustion; a cavity that is formed on an upper surface of the piston and includes a wall portion for dispersing the air-fuel mixture formed of the fuel injected from the fuel injector towards a peripheral area of the combustion chamber; and a plurality of ignitors arranged within the cylinder head so as to be located in line with the wall portion.

According to this construction, an air-fuel mixture dispersing towards the peripheral area of the combustion chamber along the wall portion can be ignited by the plurality of ignitors arranged in line with the wall portion. Accordingly, a further stability can be achieved in igniting air-fuel mixtures during stratified-charge combustion.

Next, an in-cylinder injection type internal combustion engine according to a fifth aspect of the invention includes a cylinder block; a cylinder head; a piston; a combustion chamber defined by the cylinder block, the cylinder head, and the piston; a fuel injector for injecting fuel directly towards a central area of the combustion chamber, which injects the fuel such that high and low concentration portions of an air-fuel mixture are formed in the combustion chamber during stratified-charge combustion; a cavity that is formed on an upper surface of the piston and includes a wall portion for dispersing the air-fuel mixture formed of the fuel injected by the fuel injector from a first peripheral area to a second peripheral area of the combustion chamber; a plurality of ignitors arranged within the cylinder head so as to be located in line with the wall portion; a load detector for detecting a load required of the in-cylinder injection type internal combustion engine; and an ignition controller that fires an ignitor among the plurality of ignitors which is located in the vicinity of the first peripheral area of the combustion chamber when a load detected by the load detector is low and that fires another ignitor among the plurality of ignitors which is located in the vicinity of the second peripheral area of the combustion chamber when the load detected by the load detector is high during stratified-charge combustion.

According to this construction, the high concentration portion of the air-fuel mixture formed in the first peripheral area of the combustion chamber is ignited when the required load is low, while the low concentration portion of the air-fuel mixture formed in the second peripheral area of the combustion chamber is ignited when the required load is high. Accordingly, the stratified-charge combustion region can be expanded.

Next, an in-cylinder injection type internal combustion engine according to a sixth aspect of the invention includes a cylinder block; a cylinder head; a piston; a combustion chamber defined by the cylinder block, the cylinder head, and the piston; a fuel injector for injecting a fuel directly towards a central area of the combustion chamber, which injects the fuel such that high and low concentration portions of an air-fuel mixture are formed in the combustion chamber during stratified-charge combustion; a cavity that is formed on an upper surface of the piston and includes a wall portion for dispersing the air-fuel mixture formed of the fuel injected by the fuel injector from a first peripheral area to a second peripheral area of the combustion chamber; a plurality of ignitors arranged within the cylinder head so as to be located in line with the wall portion; a load detector for detecting a load required of the in-cylinder injection type internal combustion engine; and an ignition controller that fires the plurality of ignitors at an ignition time of an ignitor among the plurality of ignitors which is located in the vicinity of the first peripheral area of the combustion chamber when a load detected by the load detector is low and that fires the plurality of ignitors at an ignition time of another ignitor among the plurality of ignitors which is located in the vicinity of the second peripheral area of the combustion chamber when the load detected by the load detector is high during stratified-charge combustion.

According to this construction, an air-fuel mixture is ignited at a time the high concentration portion of the air-fuel mixture is formed in the first peripheral area of the combustion chamber when the required load is low, while the air-fuel mixture is ignited at a time the low concentration portion of the air-fuel mixture which has dispersed and thus has an appropriate concentration is formed in the second peripheral area of the combustion chamber when the required load is high. Accordingly, the stratified-charge combustion region can be expanded.

Next, an in-cylinder injection type internal combustion engine according to a seventh aspect of the invention includes a cylinder block; a cylinder head; a piston; a combustion chamber defined by the cylinder block, the cylinder head, and the piston; a fuel injector for injecting a fuel directly towards a central area of the combustion chamber, which injects the fuel such that high and low concentration portions of an air-fuel mixture are formed in the combustion chamber during stratified-charge combustion; a cavity that is formed on an upper surface of the piston and includes a wall portion for dispersing the air-fuel mixture formed of the fuel injected from the fuel injector from a first peripheral area to a second peripheral area of the combustion chamber; a plurality of ignitors arranged within the cylinder head so as to be located in line with the wall portion; a load detector for detecting a load required of the in-cylinder injection type internal combustion engine; and an ignition controller that fires the plurality of ignitors in order from the side of the first peripheral area to the side of the second peripheral area of the combustion chamber when a load detected by the load detector is low and that fires the plurality of ignitors in order from the side of the second peripheral area to the side of the first peripheral area of the combustion chamber when the load detected by the load detector is high during stratified-charge combustion.

According to this construction, when the required load is low, an air-fuel mixture of high concentration formed in the first peripheral area of the combustion chamber is ignited and the air-fuel mixture which has dispersed to the second peripheral area is also ignited. When the required load is high, conversely, an air-fuel mixture formed in the second peripheral area, which has dispersed and thus has an appropriate concentration, is ignited, and the air-fuel mixture remaining in the first peripheral area is also ignited. Accordingly, the stratified-charge combustion region can be expanded, and a further stability can be achieved in igniting air-fuel mixtures during stratified-charge combustion.

Next, an in-cylinder injection type internal combustion engine according to an eighth aspect of the invention includes a cylinder block; a cylinder head; a piston; a combustion chamber defined by the cylinder block, the cylinder head, and the piston; a fuel injector for injecting a fuel directly towards a central area of the combustion chamber, which injects the fuel such that high and low concentration portions of an air-fuel mixture are formed in the combustion chamber during stratified-charge combustion; and a plurality of ignitors, each including an insulator having a streamline shape which matches with a flow of the air-fuel mixture formed of the fuel injected from the fuel injector.

According to this construction, a plurality of ignitors each having a streamline shape which matches with the flow of the air-fuel mixture formed of the fuel injected from the fuel injector. Thus, tumble flows produced within the combustion chamber can be prevented from becoming irregular. Accordingly, a further stability can be achieved in igniting air-fuel mixtures during stratified-charge combustion.

Also, the above in-cylinder injection type internal combustion engines may be modified as follows. For example, in the in-cylinder injection type internal combustion engine according to the fourth aspect of the invention, it is preferable that the wall portion extends in a perpendicular direction with respect to a direction in which the air-fuel mixture formed of the fuel injected from the fuel injector flows towards the cavity. According to this construction, the dispersion of the air-fuel mixture can be further promoted. Thus, even when the required load is high and a large amount of fuel is injected, the concentration of the air-fuel mixture does not become excessively high, whereby the stratified-charge combustion region can be expanded.

Furthermore, in the in-cylinder injection type internal combustion engine according to the fifth or seventh aspect of the invention, it is preferable that the fuel injector injects the fuel towards a portion of the wall portion that is closer to the first peripheral area of the combustion chamber. In this case, the air-fuel mixture can disperse from the first peripheral area to the second peripheral area with increased reliability. Also, it is preferable that a distance between the fuel injector and the wall portion increases from the side of the first peripheral area to the second peripheral area of the combustion chamber. With this arrangement, the air-fuel mixture can easily disperse from the first peripheral area to the second peripheral are of the combustion chamber. Also, it is preferable that the wall portion comprises a first wall portion which is located in the side of the first peripheral area of the combustion chamber and has the shape of an arc having a first radius and a second wall portion which is located in the side of the second peripheral area of the combustion chamber and has the shape of an arc having a second radius that is longer than the first radius. With this arrangement, an air-fuel mixture of high concentration is formed in the first peripheral area while an air-fuel mixture of concentration lower than that of the air-fuel mixture formed in the first peripheral area is formed in the second peripheral area. Thus, the air-fuel mixture of high concentration formed in the first peripheral area is ignited when the load required of the engine is low and the amount of the injected fuel is thereby small, while the air-fuel mixture of low concentration formed in the second peripheral area is ignited when the load required of the engine is high and the amount of the injected fuel is thereby high. Accordingly, the stratified-charge combustion region can be expanded, and a further stability can be achieved in igniting air-fuel mixtures during stratified-charge combustion.

Furthermore, in the in-cylinder injection type internal combustion engine according to the eighth aspect of the invention, it is preferable that a mounting portion for mounting each fuel injector in the cylinder head is provided in an upper portion of the fuel injector. This arraignment enables each ignitor to be mounted in the cylinder head such that the insulator having a streamline shape is exposed into the combustion chamber.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 15 is a longitudinal sectional view schematically showing the construction of the cylinder head and its periphery in an in-cylinder injection type internal combustion engine according to a fourth embodiment of the invention, in which the relative positions of the spark plugs are indicated;

FIG. 16 is a perspective view illustrating the relative positions of the spark plugs as viewed from the side of the combustion chamber in the in-cylinder injection type internal combustion engine according to the fourth embodiment of the invention;

FIG. 22 is a view schematically showing a third modification example of the fourth embodiment of the invention;

DETAILED DESCRIPTION OF PREFERRED EMBODIMENTS

Hereinafter, preferred embodiments of the invention will be described with reference to the accompanying figures.
(First Embodiment)

Figure 1:
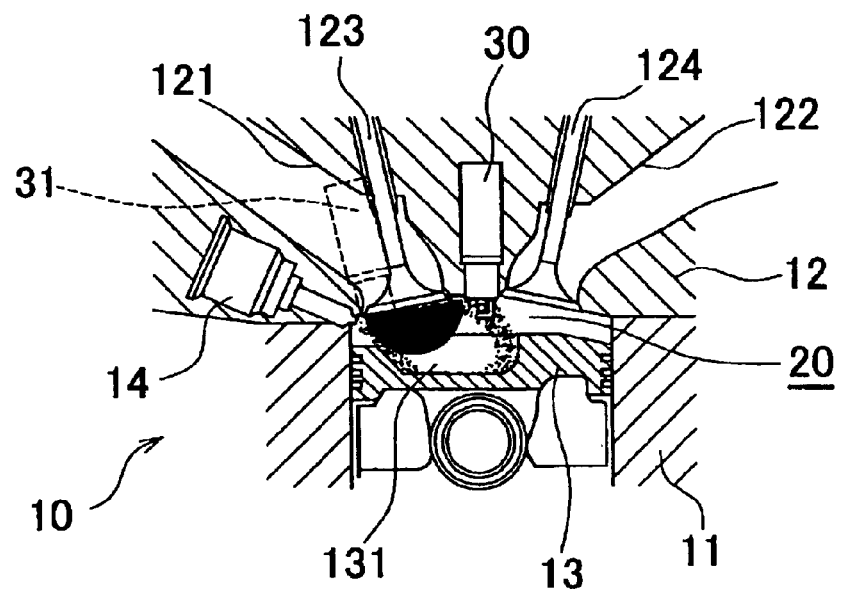
FIG. 1 is a longitudinal sectional view schematically showing the construction of a cylinder head and its periphery in an in-cylinder injection type internal combustion engine according to a first embodiment of the invention, in which relative positions of an air-fuel mixture flow and spark plugs are indicated.
Figure 2:
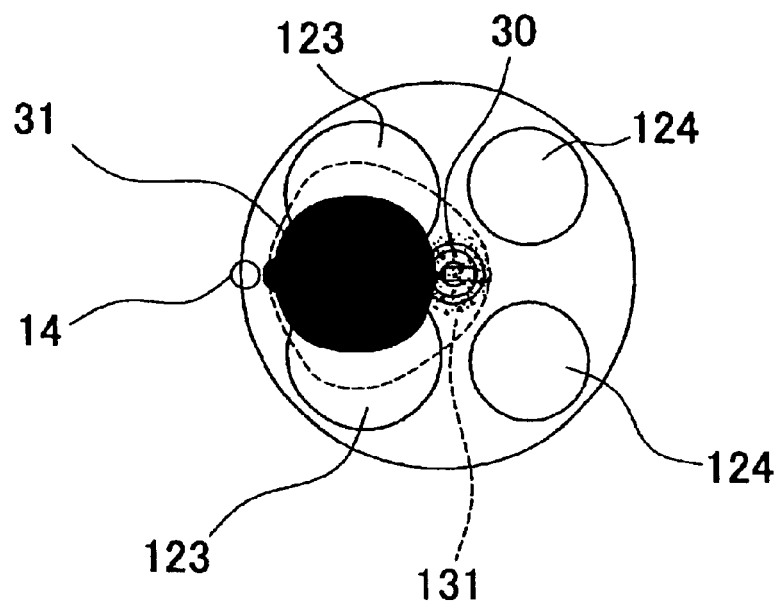
FIG. 2 is a perspective view illustrating the relative positions of the air-fuel mixture flow and the spark plugs as viewed from the side of a combustion chamber in the in-cylinder injection type internal combustion engine according to the first embodiment of the invention.
Figure 3:
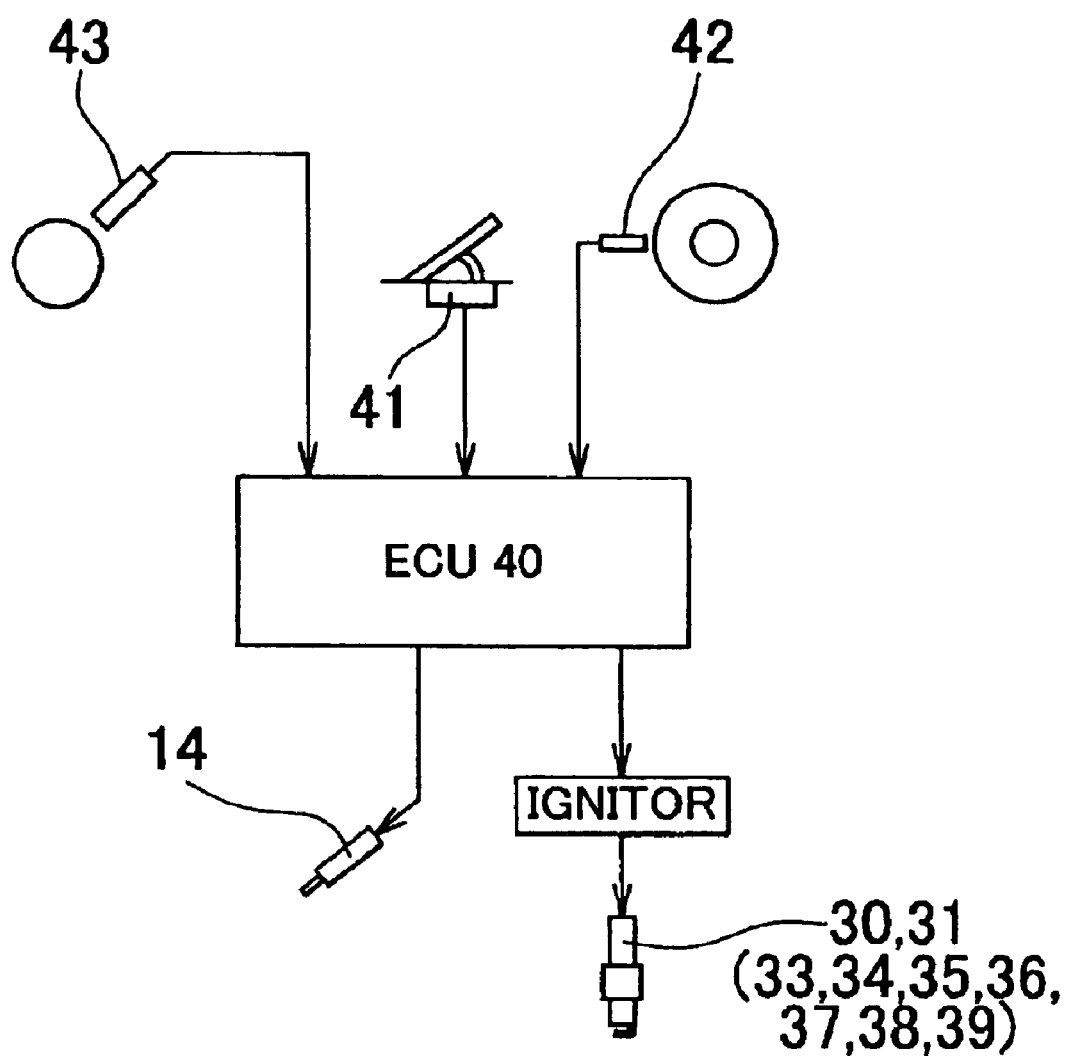
FIG. 3 is a block diagram schematically showing an outline of a control system of the in-cylinder injection type internal combustion engine according to the first embodiment of the invention.
Figure 4:
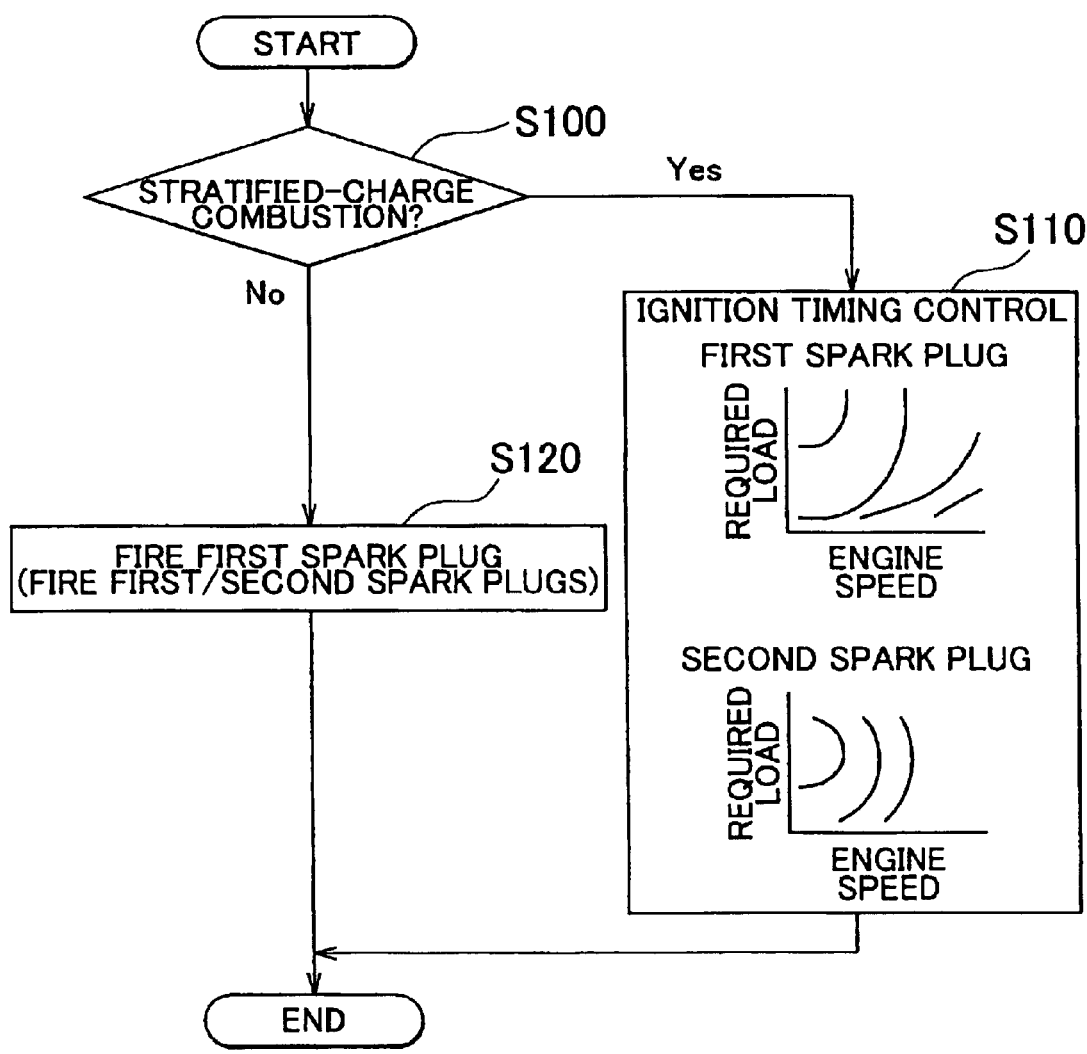
FIG. 4 is a flowchart of a control routine executed in the in-cylinder injection type internal combustion engine according to the first embodiment of the invention for controlling the ignition timing of first and second spark plugs.

To begin with, an in-cylinder injection type internal combustion engine (hereinafter will be simply referred to as "a direct injection engine" or "an engine" where appropriate) according to a first embodiment of the invention will be described with reference to FIGS. 1 to 4. FIG. 1 is a longitudinal sectional view schematically showing the construction of a cylinder head and its periphery in the direct injection engine according to the first embodiment, in which relative positions of an air-fuel mixture flow and spark plugs are indicated. FIG. 2 is a perspective view illustrating the relative positions of the air-fuel mixture flow and the spark plugs as viewed from the side of a combustion chamber. FIG. 3 is a block diagram schematically showing an outline of a control system of the direct injection engine according to the first embodiment. FIG. 4 is a flowchart of a control routine for controlling the ignition timing of first and second spark plugs of the same direct injection engine.

A direct injection engine 10 according to the first embodiment includes a cylinder block 11, a cylinder head 12, and a piston 13, which together define a combustion chamber 20. An intake port 121 and an exhaust port 122 are formed within the cylinder head 12. An intake valve 123 for opening/closing the intake port 121 to the combustion chamber 20 is disposed in the intake port 121 while an exhaust valve 124 for opening/closing the exhaust port 122 to the combustion chamber 20 is disposed in the exhaust port 122.

Also, a fuel injection valve 14 is disposed in a portion of the cylinder head 12 in the vicinity of the intake port 121 so that the fuel injection valve 14 is located at the periphery of the combustion chamber 20. The fuel injection valve 14 is of a so-called "high-pressure type" and is adapted to inject fuel which has been pressurized up to about 8 to 13 MPa by a high-pressure fuel pump (not shown) into the combustion chamber 20.

Furthermore, a first spark plug 30 is disposed in a portion of the cylinder head 12 which faces a central area of the combustion chamber 20 while a second spark plug 31 is disposed in a portion of the cylinder head 12 which faces a peripheral area of the combustion chamber 20 and which is located in the vicinity of the fuel injection valve 14. The ignition timing of these spark plugs 30, 31 is controlled by an engine control unit (will hereinafter be referred to as "an ECU") 40.

A cavity 131 is formed on the upper surface of the piston 13. During stratified-charge combustion, the cavity 131 receives the fuel injected from the fuel injection valve 14 and produces an air-fuel mixture. Since fuel is normally injected from the fuel injection valve 14 in a latter half of each compression stroke during stratified-charge combustion, it is necessary to transform the injected fuel into an air-fuel mixture by dispersing it and concentrate a combustible portion of the produced air-fuel mixture around the spark plug before the ignition time. To this end, the cavity 131 is formed on the upper surface of the piston 13 so that it functions as a small combustion chamber for fulfilling these requirements of stratified-charge combustion.

More specifically, as shown in FIG. 2, the cavity 131 is formed on the upper surface of the piston 13 so as to be offset in a direction towards the fuel injection valve 14, and the cavity 131 has a fan-like shape whose width becomes larger from the side of the first spark plug 30 to the side of the second spark plug 31. In FIG. 2, the cavity 131 is outlined by a dotted line for indicating its position relative to the positions of the spark plugs 30, 31, as viewed from the side of the bottom surface of the piston 13. As shown in FIG. 1, the cavity 131 includes a wall portion 132 having a curved shape. When fuel has been injected from the fuel injection valve 14, the air-fuel mixture moves from a peripheral area of the combustion chamber 20 towards the central area thereof while being transformed into an air fuel mixture. Then, the air-fuel mixture is guided by the wall portion 132 to flow back towards the peripheral area from the central area of the combustion chamber 20 along an internal face of the cylinder head 12.

Thus, when fuel has been injected from the fuel injection valve 14, an air-fuel mixture formed by the injected fuel first concentrates around the first spark plug 30 and disperses towards the second spark plug 31. In this way, a high-concentration portion (i.e., a rich portion) of the air-fuel mixture is provided around the first spark plug 30, while a low-concentration portion (i.e., lean portion) of the air-fuel mixture is provided around the second spark plug 31.

The direct injection engine 10 is controlled by the ECU 40 shown in FIG. 3 which is connected to various sensors for detecting the operating conditions of the direct injection engine 10, such as an accelerator position sensor 41 for detecting the depression amount of an accelerator pedal, a vehicle speed sensor 42 for detecting the vehicle speed, and a crank position sensor 43 for detecting the engine speed. Also, the ECU 40 is connected to the fuel injection valve 14 and to the spark plugs 30, 31 via an ignitor 44.

Next, the ignition timing control of the direct injection engine 10 will hereinafter be described with reference to FIG. 4. FIG. 4 is a flowchart showing a control routine of this control. The control routine is repeatedly executed at predetermined intervals. As shown in FIG. 4, the ECU 40 first determines whether the operating state of the direct injection engine 10 is in a stratified-charge combustion region on the basis of the signals input from the accelerator position sensor 41 and the crank position sensor 43 (Step S100). If it is determined that the operating state is presently in the stratified-charge combustion region (Step S100: YES), the ECU 40 sets the ignition timing of the first and second spark plugs 30, 31 based on the engine speed and the required load using a map (Step S110).

More specifically, since only a small amount of fuel is injected from the fuel injection valve 14 when the load required of the engine 10 is low, an air-fuel mixture therefore tends to concentrate in the central area of the combustion chamber 20 and a combustible portion of the air-fuel mixture is likely to be provided in the vicinity of the first spark plug 30. In this case, therefore, the ECU 40 first fires the first spark plug 30 to ignite the combustible portion of the air-fuel mixture provided in the central area, and thereafter fires the second spark plug 31. That is, even if the combustible portion of the air-fuel mixture fails to be ignited by the first spark plug 30, the second spark plug 31 is subsequently fired to ignite the combustible portion when it has moved to the peripheral area of the combustion chamber 20. In this way, a further stability can be achieved in combusting air-fuel mixtures during the low-load engine operation.

When the required load is high, conversely, the fuel injection valve 14 injects a large amount of fuel. Therefore, the concentration of the air-fuel mixture concentrated to the central area of the combustion chamber 20 becomes excessively high. Here, if such a rich air-fuel mixture is ignited by the first spark plug 30, it may result in increased fuel consumption, namely in a reduction in the combustion efficiency. In this case, therefore, the ECU 40 first fires the second spark plug 31 to ignite a portion of the air-fuel mixture provided in the peripheral area of the combustion chamber 20, which has been dispersed from the central area and thus has an appropriate concentration, and the ECU 40 thereafter fires the first spark plug 30 to ignite a portion of the air-fuel mixture which remains in the central area of the combustion chamber 20. This control achieves an expansion of the stratified-charge combustion region for the high-load engine operation, which has been difficult to achieve, as well as an improvement in the combustion efficiency during the high-load engine operation. On the contrary, in the case where only a single spark plug is used and it is disposed in the portion of the cylinder head 12 facing the central area of the combustion chamber 20, when an air-fuel mixture is ignited after it has been sufficiently dispersed, it may happen that almost no air-fuel mixture remains around the spark plug at the ignition time and the combustion of the air-fuel mixture therefore fails.

Back to the determination in the step S100, if it is determined that the operating state of the direct injection engine 10 is not in the stratified-charge combustion region (Step S100: NO), the ECU 40 fires only the first spark plug 30, or simultaneously fires the first and second spark plugs 30, 31 at a predetermined time (Step S120), after which the routine ends. That is, since fuel is injected from the fuel injection valve 14 during each intake stroke during homogenous-charge combustion, an air-fuel mixture has already been evenly dispersed within the combustion chamber 20 before the ignition time. During homogenous-charge combustion, therefore, air-fuel mixtures can be stably ignited and combusted without firing the first and second spark plugs 30, 31 at different times.

Figure 5:
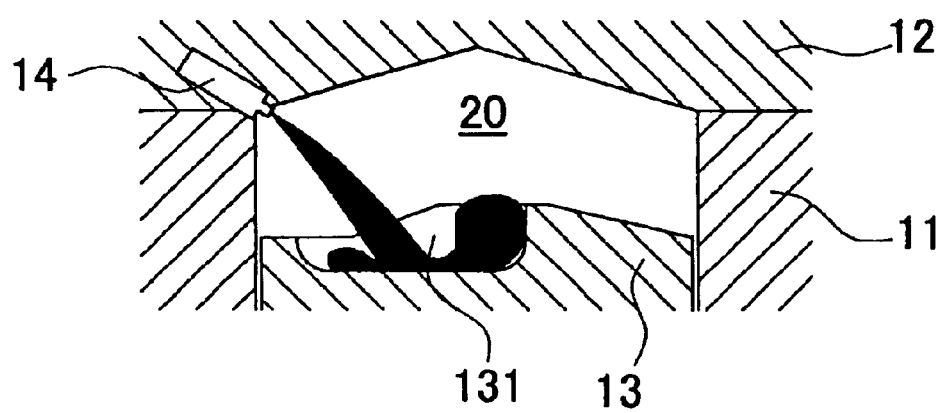
FIG. 5 is a view illustrating the state of an air-fuel mixture when fuel has been injected from a fuel injection valve towards a cavity in the in-cylinder injection type internal combustion engine according to the first embodiment of the invention.
Figure 6:
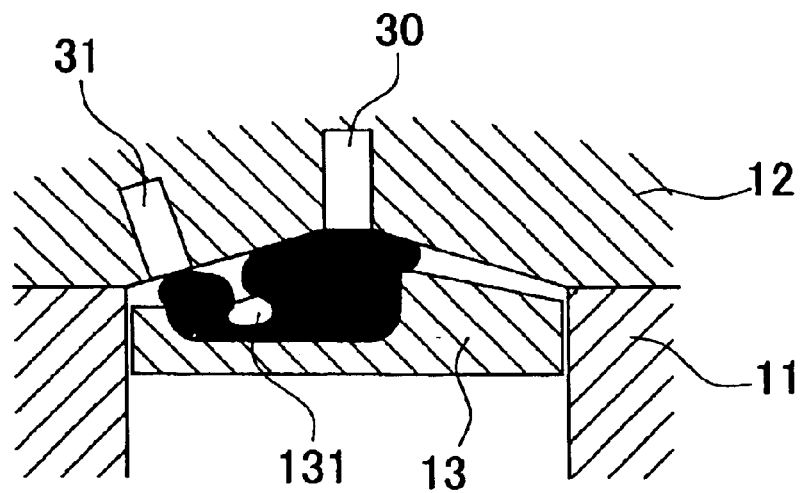
FIG. 6 is a view illustrating the state of the air-fuel mixture when a piston has moved up to the top dead center during a compression stroke in the in-cylinder injection type internal combustion engine according to the first embodiment of the invention.

Hereinafter, further effects and advantages achieved in the direct injection engine 10 according to the first embodiment will be described with reference to FIGS. 5 and 6. FIG. 5 is a view illustrating the state of an air-fuel mixture when fuel has been injected from the fuel injection valve 14 towards the cavity 131. FIG. 6 is a view illustrating the state of the air-fuel mixture when the piston 13 has moved up to the top dead center during a compression stroke.

During stratified-charge combustion, after fuel has been injected into the combustion chamber 20 (i.e., towards the cavity 131), the fuel moves towards the first spark plug 30 along the wall portion 132 by its penetrating force, whereby an air-fuel mixture is formed in the vicinity of the first spark plug 30. Here, this air-fuel mixture is called "a main air-fuel mixture." At this time, a portion of the fuel hits against a bottom portion 133 of the cavity 131 and moves towards the periphery of the combustion chamber 20 in a direction opposite to the flow of the main air-fuel mixture, whereby another air-fuel mixture is formed in a peripheral area of the combustion chamber 20. Here, this air-fuel mixture is called "a secondary air-fuel mixture." When a large amount of fuel is injected from the fuel injection valve 14, the main and secondary air-fuel mixtures are formed as a series of air-fuel mixtures. When a small amount of fuel is injected, however, they may be formed separated from each other. In the case where only a single spark plug is used and is disposed in the portion of the cylinder head 12 facing the central area of the combustion chamber 20, even when the main and secondary air-fuel mixtures are formed separated from each other as described above, the fuel gas expands and thereby narrows down the space between those air-fuel mixtures. At the ignition time, therefore, the flame of the main air-fuel mixture can reach and ignite the secondary air-fuel mixture. However, as the amount of the fuel injected from the fuel injection valve 14 reduces, the space between the main and secondary air-fuel mixtures expands, thus making it more and more difficult for the flame of the main air-fuel mixture to reach the secondary air-fuel mixture at the ignition time. When the secondary air-fuel mixture fails to be ignited, it is ejected out from the combustion chamber 20 as unburned fuel.

The above problem may be resolved by preventing the main and secondary air-fuel mixtures from being separated from each other. However, considering the fact that this separation originates from the penetrating force of the injected fuel, it may become rather difficult or impossible to form the main air-fuel mixture in an appropriate fashion if the penetrating force of the fuel is reduced.

In view of this, the direct injection engine 10 is provided with the second spark plug 31 disposed in the portion of the cylinder head 12 facing the peripheral area of the combustion chamber 20 as described above. With the second spark plug 31, even if the main and secondary air-fuel mixtures are formed separated from each other, they can be ignited by the first spark plug 30 and the second spark plug 31 respectively. Accordingly, the combustion efficiency improves and the amount of unburned fuel contained in the exhaust gas reduces.

(Second Embodiment)

Figure 7:
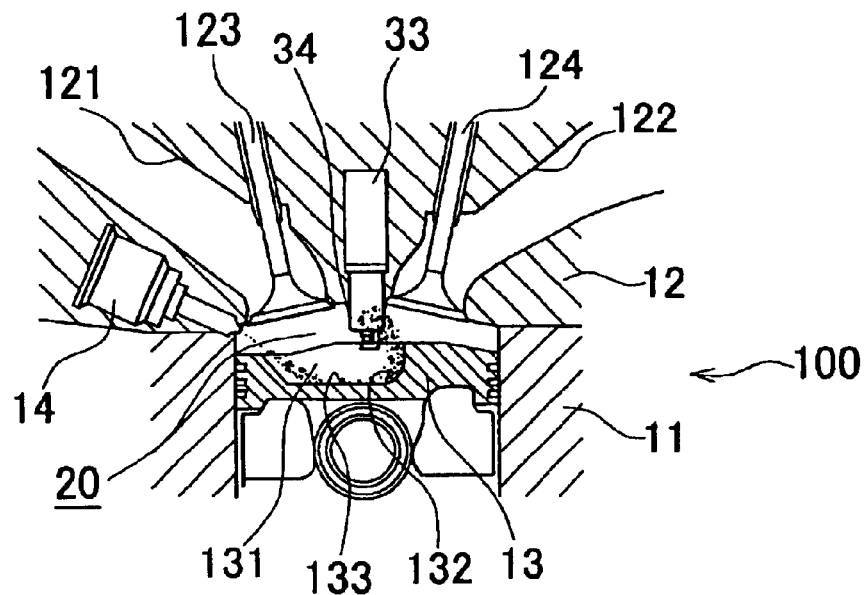
FIG. 7 is a longitudinal sectional view schematically showing the construction of the cylinder head and its periphery in an in-cylinder injection type internal combustion engine according to a second embodiment of the invention, in which relative positions of the air-fuel mixture flow and the spark plugs when the engine is operating at a low engine speed are indicated.
Figure 8:
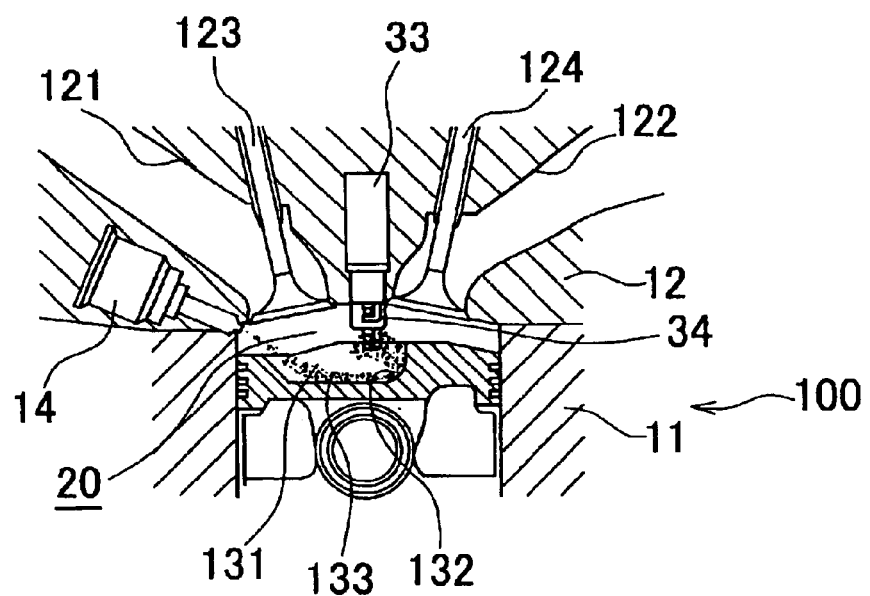
FIG. 8 is a longitudinal sectional view schematically showing the construction of the cylinder head and its periphery of the in-cylinder injection type internal combustion engine according to the second embodiment of the invention, in which the relative positions of the air-fuel mixture flow and the spark plugs when the engine is operating at a high engine speed are indicated.
Figure 9:
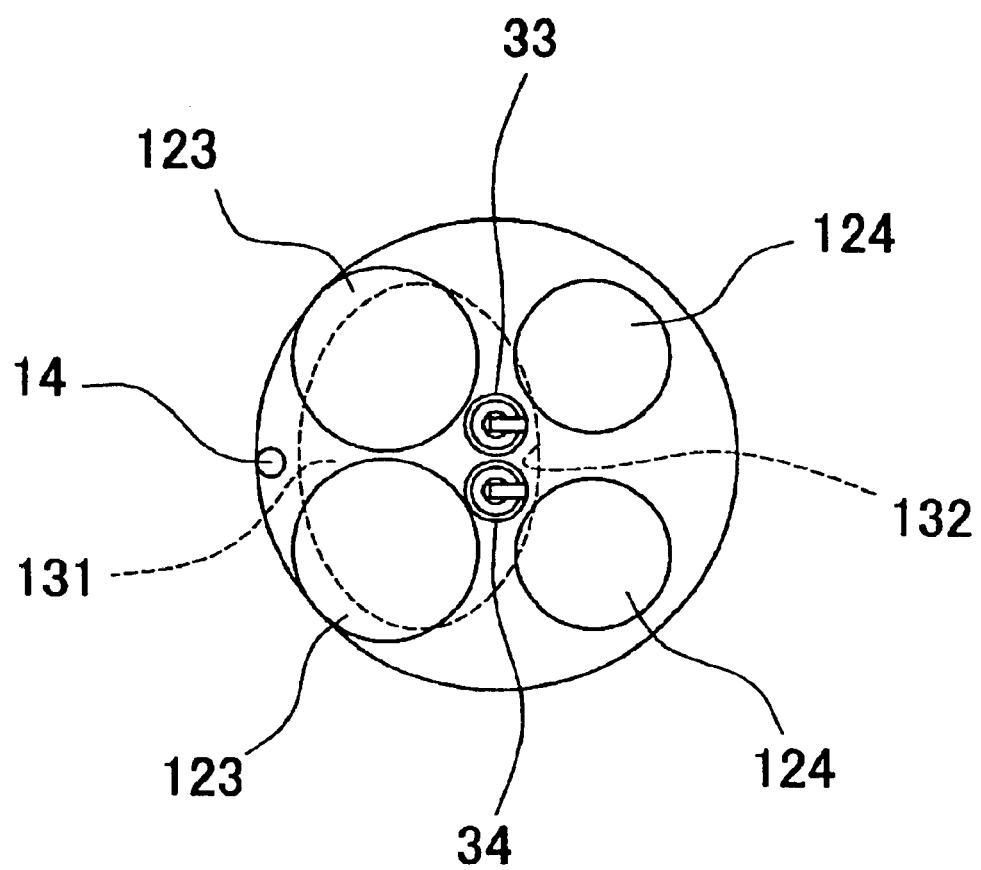
FIG. 9 is a perspective view illustrating the relative positions of the air-fuel mixture flow and the spark plugs as viewed from the side of the combustion chamber in the in-cylinder injection type internal combustion engine according to the second embodiment of the invention.
Figure 10:
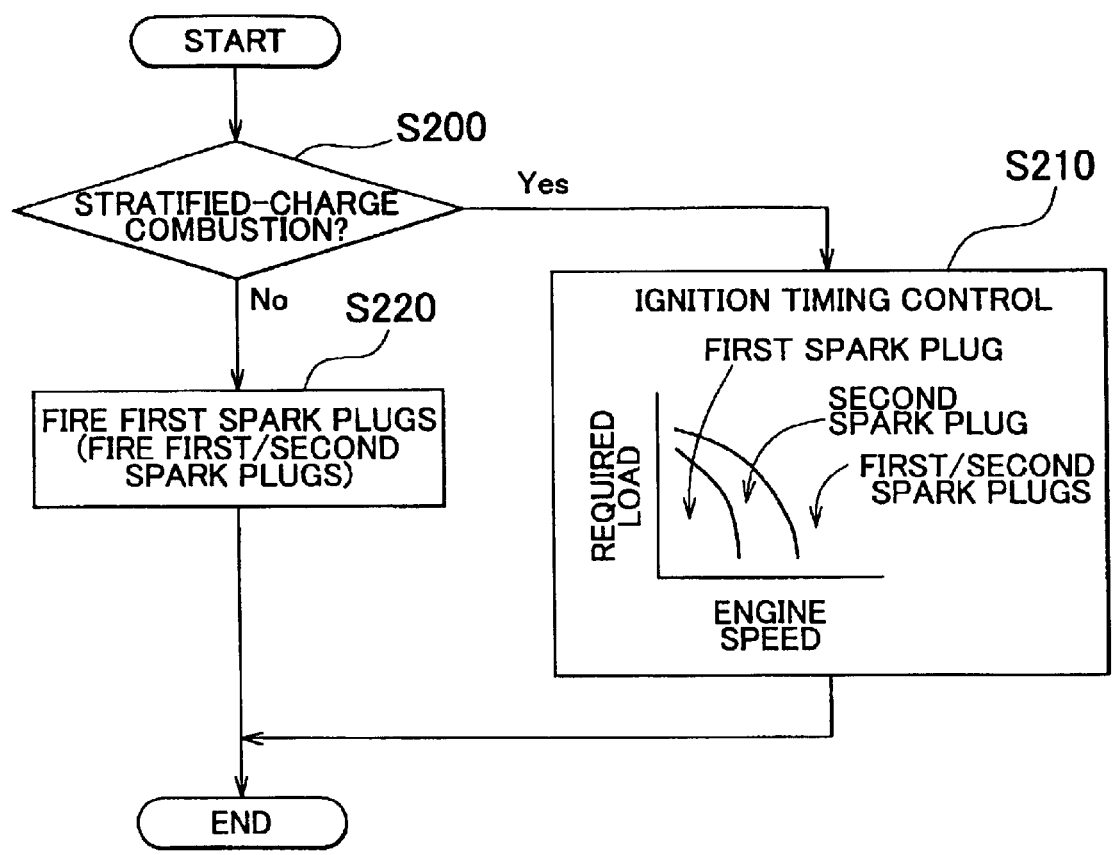
FIG. 10 is a flowchart of a control routine executed in the in-cylinder injection type internal combustion engine according to the second embodiment of the invention for controlling the ignition timing of the first and second spark plugs.

Next, a direct injection engine according to a second embodiment of the invention will hereinafter be described with reference to FIGS. 7 to 10. FIG. 7 is a longitudinal sectional view schematically showing the construction of the cylinder head and its periphery in the direct injection engine according to the second embodiment, in which the relative positions of an air-fuel mixture flow and the spark plugs when the engine is operating at a low engine speed are indicated. FIG. 8 is a longitudinal sectional view schematically showing the construction of the cylinder head and its periphery of the same direct injection engine, in which the relative positions of the air-fuel mixture flow and the spark plugs when the engine is operating at a high engine speed are indicated. FIG. 9 is a perspective view illustrating the relative positions of the air-fuel mixture flow and the spark plugs as viewed from the side of the combustion chamber. FIG. 10 is a flowchart of a control routine for controlling the ignition timing of the first and second spark plugs of the direct injection engine according to the second embodiment.

Here, it is to be noted that a direct injection engine 100 of the second embodiment has the same construction as that of the direct injection engine 10 of the first embodiment except for the arrangement of the first and second spark plugs. Therefore, the same elements as those described in the first embodiment will be denoted with the same reference numerals and characters and explanation thereof will be omitted in the following description.

In the direct injection engine 100, a first spark plug 33 and a second spark plug 34 are disposed in the portion of the cylinder head 12 facing the central area of the combustion chamber 20 so as to be located in line with the wall portion 132 of the cavity 131. The first spark plug 33 is arranged in the cylinder head 12 such that its protruding length, which is the length of a portion of each spark plug protruding out from the cylinder head 12 towards the inside of the combustion chamber 20, becomes substantially equal to, for example, the value which is normally used as the protruding length of spark plugs. On the other hand, the second spark plug 34 is arranged in the cylinder head 12 such that its protruding length is longer than that of the first spark plug 33. Meanwhile, the protruding length of these plugs 33, 34 may be defined as being the distance from the internal face of the cylinder head 12 to an earth electrode of each spark plug. In FIG. 9, the cavity 131 is outlined by a dotted line for indicating its position relative to the positions of the spark plugs 33, 34 as viewed from the side of the bottom surface of the piston 13.

Next, the ignition timing control of the engine 100 will hereinafter be described with reference to FIG. 10. FIG. 10 is a flowchart showing a control routine of the ignition timing control. This control routine is repeatedly executed at predetermined intervals. As shown in FIG. 10, the ECU 40 first determines whether the operating state of the engine 100 is presently in the stratified-charge combustion region on the basis of the signals input from the accelerator position sensor 41 and the crank position sensor 43 (Step S200). If it is determined that the operating state is presently in the stratified-charge combustion region (Step S200: YES), the ECU 40 then sets the ignition timing of the first and second spark plugs 33, 34 based on the engine speed using a map (Step S210).

More specifically, when the engine 100 is operating at a low engine speed, the piston 13 moves at a speed lower than the speed at which the air-fuel mixture formed of the fuel injected from 14 moves. Thus, the combustible portion of the air-fuel mixture is already in the upper central area of the combustion chamber 20 at the ignition time. In this case, therefore, the ECU 40 fires the first spark plug 33 to ignite the combustible portion of the air-fuel mixture in the upper central area of the combustion chamber 20.

When the direct injection engine 100 is operating at a high engine speed, conversely, the piston 13 moves at a speed higher than the speed at which the air-fuel mixture moves. Thus, the combustible portion of the air-fuel mixture is still in the cavity 131 at the ignition time. In this case, therefore, the ECU 40 fires the second spark plug 34 to ignite the combustible portion of the air-fuel mixture provided in the vicinity of the bottom portion 133 of the cavity 131.

As the engine speed further increases, the behavior of the air-fuel mixture may become irregular within the combustion chamber 20 to an extent that it can not be classified into the behaviors of the above two types. In this case, the ECU 40 fires both the first and second spark plugs 33, 34. In this way, the air-fuel mixture can be ignited by at least one of those plugs 33, 34 even when the air-fuel mixture moves in an irregular fashion within the combustion chamber 20.

If the protruding length of the spark plugs is short, as the piston moves at a higher speed, it is difficult to ignite the combustible portion of the air-fuel mixture formed in the vicinity of the bottom portion of the cavity, which may lead to a misfire or the like. Thus, air-fuel mixtures can not be stably combusted. According to the direct injection engine 100 of the second embodiment, however, stratified-charge combustion can be performed even at a high engine speed as described above, whereby the stratified-charge combustion region can be expanded.

Back to the determination in the step S200, if it is determined that the operating state of the engine 100 is not in the stratified-charge combustion region (Step S200: NO), the ECU 40 ignites only the first spark plug 33 (Step 220), after which the routine ends. That is, since fuel is injected from the fuel injection valve 14 during each intake stroke in homogenous-charge combustion, the air-fuel mixture has already been evenly dispersed within the combustion chamber 20 before the ignition time. In this way, air-fuel mixtures can be stably combusted even if only the first spark plug 33 is fired.

Figure 11:
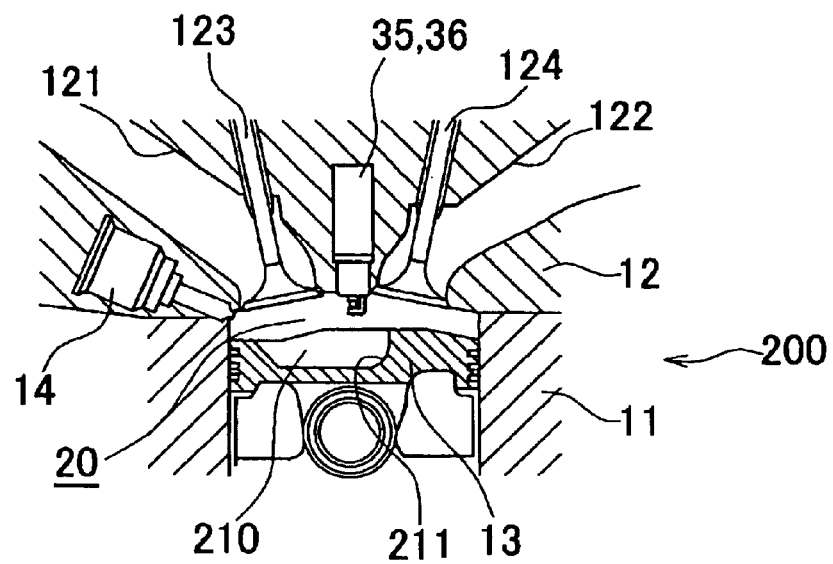
FIG. 11 is a longitudinal sectional view schematically showing the construction of the cylinder head and its periphery in an in-cylinder injection type internal combustion engine according to a third embodiment of the invention, in which the relative positions of the spark plugs are indicated.
Figure 12:
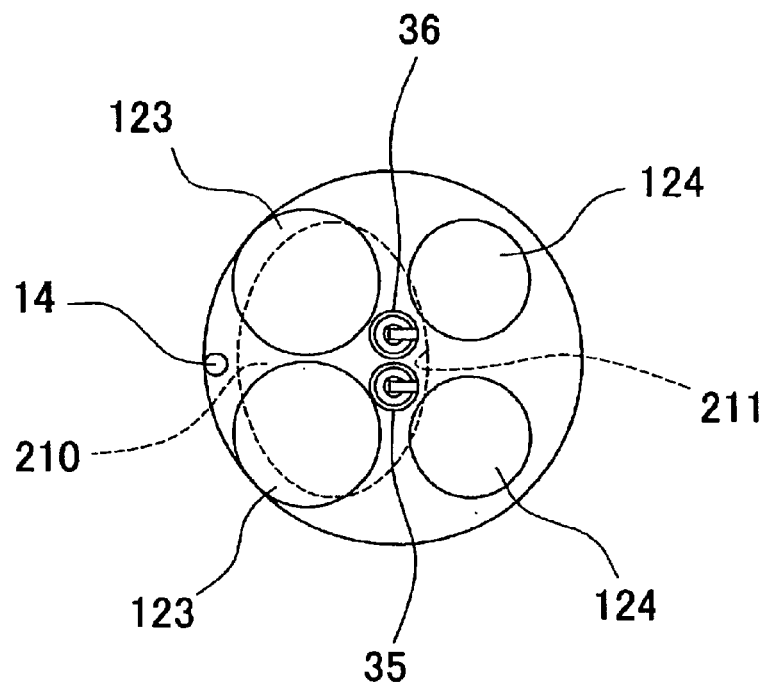
FIG. 12 is a perspective view illustrating the relative positions of the spark plugs as viewed from the side of the combustion chamber in the in-cylinder injection type internal combustion engine according to the third embodiment of the invention.
Figure 13:
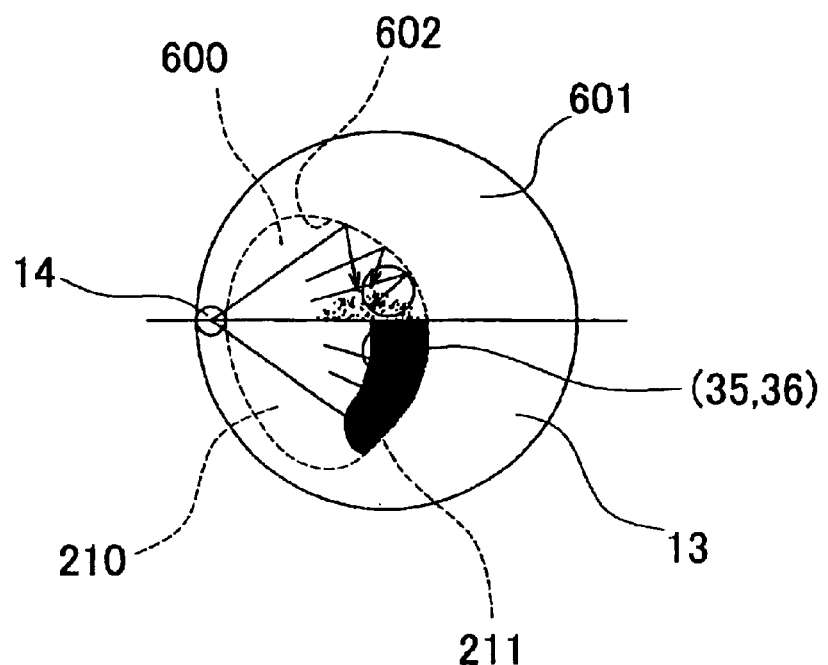
FIG. 13 is a view illustrating the dispersed state of an air-fuel mixture established with a conventional cavity when load required of the engine is low and that established with a cavity of the in-cylinder injection type internal combustion engine according to the third embodiment of the invention when the load required of the engine is low for comparison therebetween.
Figure 14:
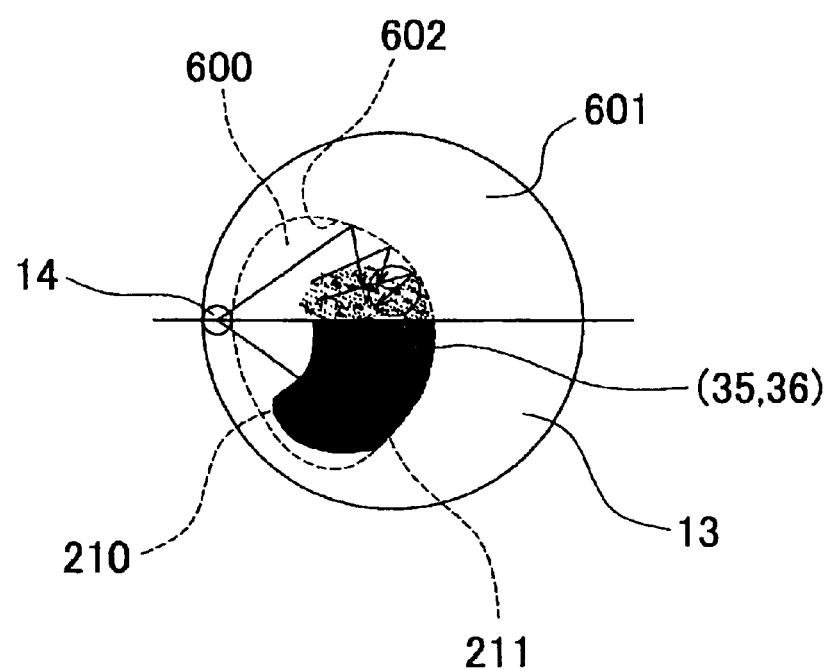
FIG. 14 is a view illustrating the dispersed state of an air-fuel mixture established with the conventional cavity when the load required of the engine is high and that established with the cavity of the in-cylinder injection type internal combustion engine according to the third embodiment of the invention when the load required of the engine is high for comparison therebetween.

Next, a direct injection engine according to a third embodiment of the invention will hereinafter be described with reference to FIGS. 11 to 14. FIG. 11 is a longitudinal sectional view schematically showing the construction of the cylinder head and its periphery in the direct injection engine according to the third embodiment, in which the relative positions of the spark plugs are indicated. FIG. 12 is a perspective view illustrating the relative positions of the spark plugs as viewed from the side of the combustion chamber. FIG. 13 is a view illustrating the dispersed state of an air-fuel mixture established with a conventional cavity during the low-load engine operation and that established with a cavity in the third embodiment during the low-load engine operation for comparison therebetween. FIG. 14 is a view illustrating the dispersed state of the air-fuel mixture established with the conventional cavity during the high-load engine operation and that established with the cavity in the third embodiment during the high-load engine operation for comparison therebetween.

Here, it is to be noted that a direct injection engine 200 of the third embodiment has the same construction as that of the direct injection engine 10 of the first embodiment except for the arrangement of the first and second spark plugs and the shape of the cavity. Therefore, the same elements as those described in the first embodiment will be denoted with the same reference numerals and characters and explanation thereof will be omitted in the following description.

In the direct injection engine 200, as shown in FIGS. 11 and 12, a first spark plug 35 and a second spark plug 36 are disposed in the portion of the cylinder head 12 facing the central area of the combustion chamber 20 so as to be located in line with a wall portion 211 of a cavity 210. The first and second spark plugs 35, 36 have an equal protruding length. Here, it is preferable that the spark plugs 35, 36 be sufficiently spaced from each other. In FIG. 9, the cavity 210 is outlined by a dotted line for indicating its position relative to the spark plugs 35, 36, as viewed from the side of the bottom surface of the piston 13.

In FIGS. 13, 14, the a dispersed state of an air-fuel mixture established with a conventional cavity 600 is shown in the upper half of each figure while the dispersed state of an air-fuel mixture established with the cavity 210 in the third embodiment is shown in the lower half. In FIGS. 13, 14, the cavities 210, 600 are outlined by a dotted line for indicating their positions relative to the positions of the spark plugs 35, 36 as viewed from the side of the bottom surface of the piston 13. Referring to FIGS. 13, 14, the cavity 600 includes a wall portion 602, the distance from which to the end of the fuel injection valve 14 gradually reduces from the side of the central area of the combustion chamber 20 to the side of the peripheral area thereof. Namely, the cavity 600 is formed in the shape of an arc whose curvature radius about the end of the fuel injection valve 14 gradually reduces from the side of the central area of the combustion chamber 20 to the side of the peripheral area thereof. Thus, the cavity 600 has a "concentrating shape", which is a shape suitable for concentrating the injected fuel towards the central area of the combustion chamber 20.

On the other hand, the cavity 210 in the third embodiment includes the wall portion 211, the distance from which to the end of the fuel injection valve 14 is substantially constant at any portion thereof. Namely, the wall portion 211 is formed in the shape of an arc whose curvature radius about the end of the fuel injection valve 14 is substantially constant at any portion thereof. Thus, the cavity 210 has a "dispersing shape", which is a shape suitable for widely dispersing the fuel injected from the fuel injector. Namely, the fuel (the air-fuel mixture) is dispersed from the central area of the combustion chamber 20 towards its periphery as the fuel moves along the wall portion 211 of the cavity 210. Meanwhile, the first and second spark plugs 35, 36 are fired at the same time.

Since the shape of the conventional cavity 600 is basically made suitable for igniting an air-fuel mixture using a single spark plug, when fuel is injected from the fuel injector 14, the air-fuel mixture concentrates through the cavity 600 into the central area of the combustion chamber 20. Therefore, in the case where a plurality of spark plugs are provided with respect to such a conventional cavity, it may happen that almost no air-fuel mixture is produced in the vicinity of those spark plugs. Especially, during the low-load engine operation where only a small amount of fuel is injected, the air-fuel mixture provided in the vicinity of the electrodes of the spark plugs 35, 56 may be insufficient as shown in FIG. 13, therefore the air-fuel mixture can not be stably ignited and combusted. Also, as shown in FIG. 14, considering the fact that the air-fuel mixture may irregularly move within the combustion chamber 20, a sufficient amount of the air-fuel mixture can not always be provided in the vicinity of the electrodes of the spark plugs 35, 36 even during the high-load engine operation.

In the mean time, the cavity 210 in the third embodiment, as shown in FIGS. 13, 14, has the dispersing shape for dispersing the air-fuel mixture formed of the fuel injected by the fuel injection valve 14 from the central area to the peripheral area of the combustion chamber 20. Thus, a sufficient amount of an air-fuel mixture can be provided in the vicinity of the electrodes of the spark plugs 35, 36 which, are disposed in line with the wall portion 211. Namely, with the cavity 210, the combustible region can be expanded within the combustion chamber 20. By the way, as described above, the conventional cavity 600 involves the problem that the concentration of the air-fuel mixture in the vicinity of the spark plug becomes excessively high during the high-load engine operation. According to the third embodiment, however, the concentration of the air-fuel mixture is made appropriate as it is sufficiently dispersed via the cavity 210. As a result, the combustion efficiency is maintained at a high level and the amount of unburned fuel is reduced, whereby the stratified-charge combustion region for the high-load engine operation can be expanded.

(Fourth Embodiment)

Figure 17:
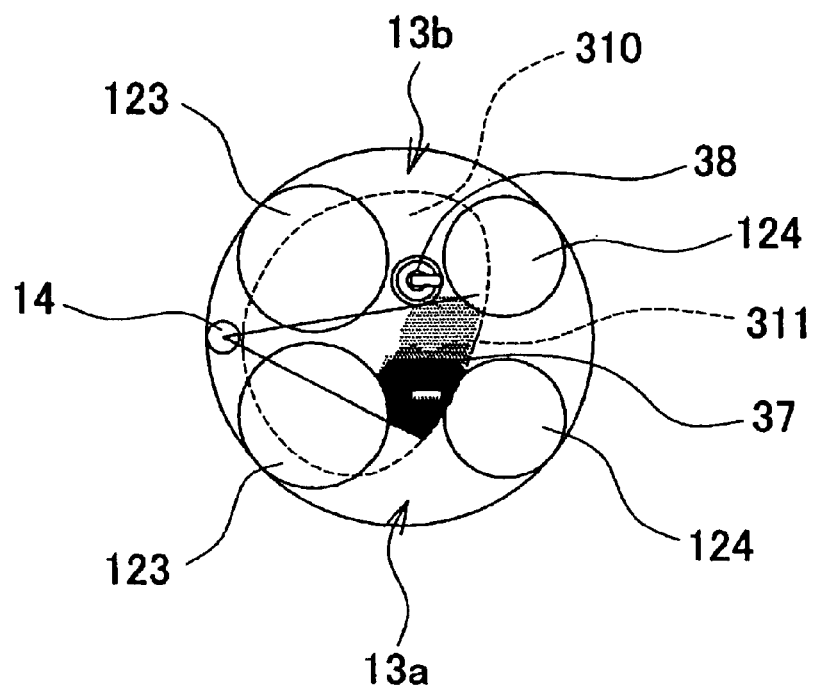
FIG. 17 is a view illustrating the dispersed state of an air-fuel mixture when the load required of the engine is low in the in-cylinder injection type internal combustion engine according to the fourth embodiment of the invention.
Figure 18:
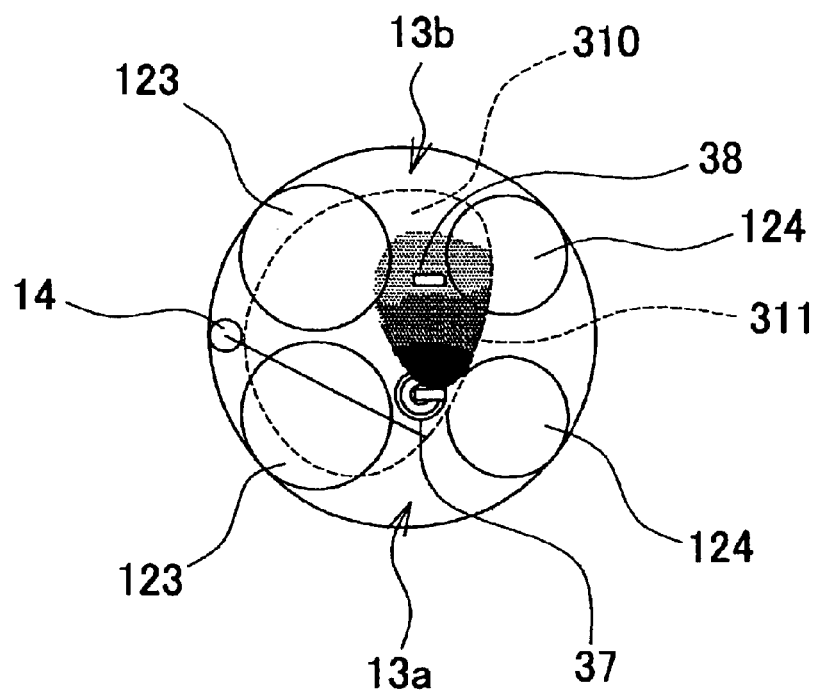
FIG. 18 is a view illustrating the dispersed state of an air-fuel mixture when the load required of the engine is high in the in-cylinder injection type internal combustion engine according to the fourth embodiment of the invention.

Next, a direct injection engine 300 according to a fourth embodiment of the invention will hereinafter be described with reference to FIGS. 15 to 18. FIG. 15 is a longitudinal sectional view schematically showing the construction of the cylinder head and its periphery in the direct injection engine according to the fourth embodiment, in which the relative positions of the spark plugs are indicated. FIG. 16 is a perspective view illustrating the relative positions of the spark plugs as viewed from the side of the combustion chamber. FIG. 17 is a view illustrating the dispersed state of an air-fuel mixture during the low-load engine operation in the direct injection engine of the fourth embodiment. FIG. 18 is a view illustrating the dispersed state of an air-fuel mixture during the high-load engine operation in the same direct injection engine.

Here, it is to be noted that a direct injection engine 300 of the fourth embodiment has the same construction as that of the direct injection engine 10 of the first embodiment except for the arrangement of the first and second spark plugs and the shape of the cavity. Therefore, the same elements as those described in the first embodiment will be denoted with the same reference numerals and characters and explanation thereof will be omitted in the following description. In Figs, 16 to 18, a cavity 310 is outlined by a dotted line for indicating its position relative to spark plugs 37, 38 as viewed from the side of the bottom surface of the piston 13.

In the direct injection engine 300, the first spark plug 37 and the second spark plug 38 are disposed in the portion of the cylinder head 12 facing the central area of the combustion chamber 20 so as to be substantially perpendicular to the direction in which fuel is injected from the fuel injection valve 14, namely so as to be located substantially in line with a wall portion 311 of the cavity 310. The first and second spark plugs 37, 38 have an equal protruding length. Also, it is preferable that the spark plugs 37, 38 be sufficiently spaced from each other.

In the fourth embodiment, the cavity 310 includes the wall portion 311 for dispersing the air-fuel mixture formed of the fuel injected from the fuel injection valve 14 from the side of a peripheral area 13a to the side of a peripheral area 13b of the combustion chamber 20. The wall portion 311 is arranged eccentric with respect to the fuel injection valve 14. More specifically, the wall portion 311 is formed such that the distance from the wall portion 311 to the end of the fuel injection valve 14 gradually increases from the side of the peripheral area 13a to the side of the peripheral area 13b. In other words, the wall portion 311 is formed in the shape of an arc whose curvature radius about the end of the fuel injection valve 14 gradually increases from the side of the peripheral area 13a to the side of the peripheral area 13b. With the wall portion 311 thus formed, when fuel is injected from the fuel injection valve 14, the air-fuel mixture first stagnates in the peripheral area 13a which is close to the fuel injection valve 14. Subsequently, since the volume of the space above the cavity 310 increases from the side of the peripheral area 13a to the side of the peripheral area 13b, the air-fuel mixture disperses while moving towards the peripheral area 13b where the volume of the space above the cavity 310 is relatively large. Meanwhile, the first spark plug 37 is arranged close to the peripheral area 13a while the second spark plug 38 is arranged close to the peripheral area 13b.

In the direct injection engine 300, the fuel injection angle of the fuel injection valve 14 is set to a narrow angle so that an air-fuel mixture can reliably disperse from the side of the peripheral area 13a to the side of the peripheral area 13b.

Figure 19:
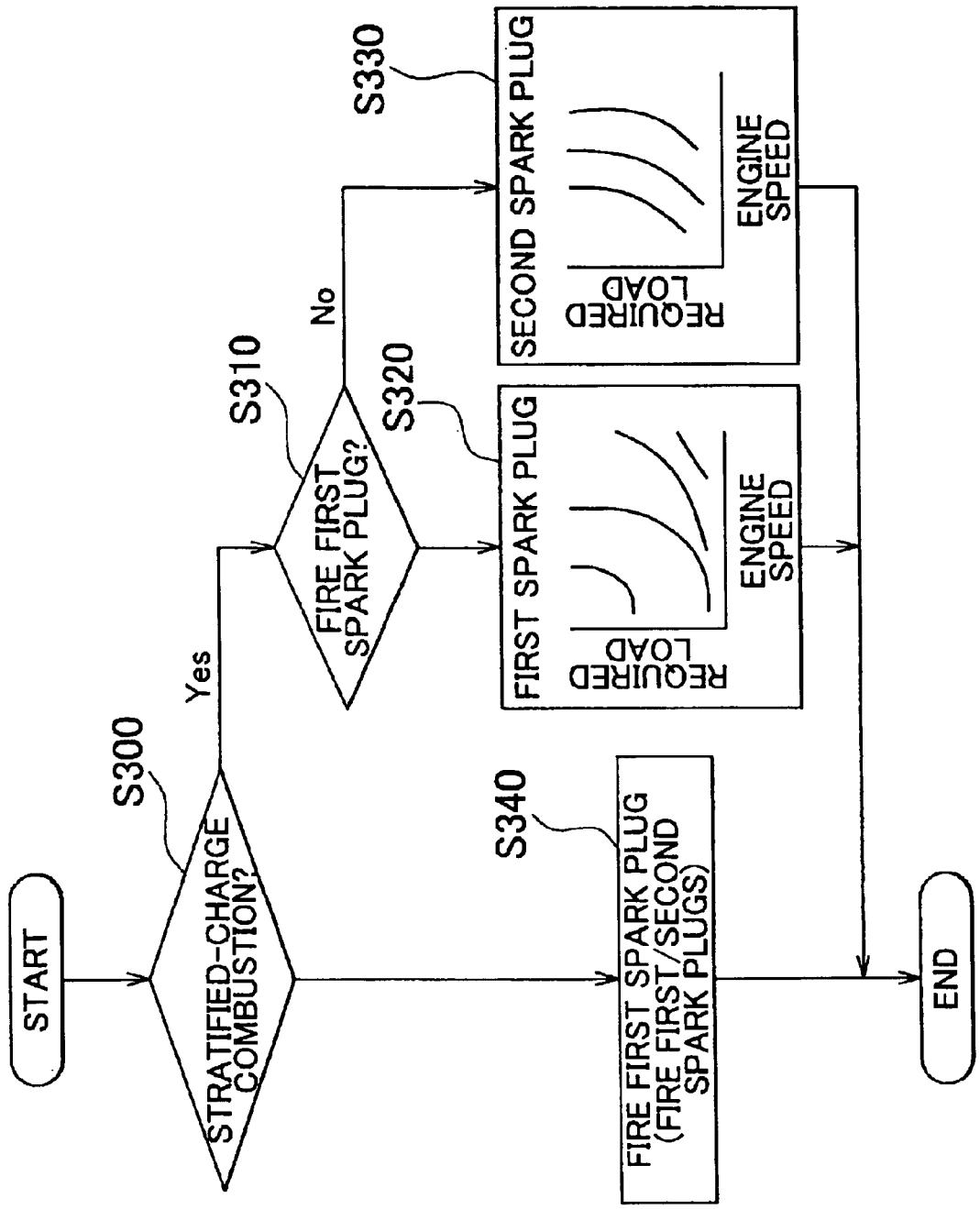
FIG. 19 is a flowchart of a control routine executed in the in-cylinder injection type internal combustion engine according to the fourth embodiment of the invention for controlling the ignition timing of the first and second spark plugs.

Next, the ignition timing control of the direct injection engine 300 will hereinafter be described with reference to FIG. 19. FIG. 19 is a flowchart showing a control routine of the ignition timing control. This control routine is repeatedly executed at predetermined intervals. As shown in FIG. 19, the ECU 40 first determines whether the operating state of the direct injection engine 300 is presently in the stratified-charge combustion region on the basis of the signals input from the accelerator position sensor 41 and the crank position sensor 43 (Step S300). If it is determined that the operating state is presently in the stratified-charge combustion region (Step S300: YES), the ECU 40 then determines which of the first and second spark plugs 37, 38 is ignited based on the required load using a map (Step S310).

More specifically, since only a small amount of fuel is injected from the fuel injection valve 14 when the required load is low, the air-fuel mixture tends to concentrate in a portion of the cavity 310 closer to the side of the peripheral area 13a, whereby a combustible portion of the air-fuel mixture is provided in the vicinity of the first spark plug 37. In this case, therefore, the ECU 40 fires the first spark plug 37 in accordance with an ignition timing control map to ignite the combustible portion of the air-fuel mixture provided within the portion of the cavity 310 closer to the side of the peripheral area 13a (Step S320). In this way, air-fuel mixtures can be stably ignited and combusted even during the low-load engine operation.

When the required load is high, conversely, a large amount of fuel is injected from the fuel injection valve 14. Therefore, the concentration of the portion of air-fuel mixture concentrated in the portion of the cavity 310 closer to the side of the peripheral area 13a becomes excessively high. Here, if the air-fuel mixture is ignited by the first spark plug 37, it may result in a reduction in the combustion efficiency (i.e., an increase in the fuel consumption) and an increase in the unburned fuel. In this case, therefore, the ECU 40 fires the second spark plug 38 in accordance with an indignation timing control map to ignite a portion of the air-fuel mixture which has dispersed from the side of the peripheral area 13a to the side of the peripheral area 13b and thus has an appropriate concentration. This control achieves an expansion of the stratified-charge combustion region for the high-load engine operation, which has been difficult to achieve, as well as an improvement in the combustion efficiency during the high-load engine operation.

Back to the determination in the step S300, if it is determined that the operating state of the direct injection engine 300 is not in the stratified-charge combustion region (Step S300: No), the ECU 40 ignites either one of the first and second spark plugs 37, 38 or simultaneously ignites both of them at a predetermined time (Step S320), after which the routine ends. Namely, since fuel is injected from the fuel injection valve 14 during each intake stroke in homogenous-charge combustion, an air-fuel mixture has already been evenly dispersed within the combustion chamber 20 before the ignition time. In this way, air-fuel mixtures can be stably ignited and combusted without firing the first and second spark plugs 37, 38 at different times.

In conventional direct injection engines, such a control of the dispersion of air-fuel mixtures is performed by producing swirls through the valve drive control, by way of example. With the direct injection engine 300, on the other hand, the dispersion of air-fuel mixtures is controlled by the shape of the cavity 310 and the arrangement of the spark plugs 37, 38 as described above. That is, according to the fourth embodiment, it is not necessary to control opening/closing of the valves for controlling the dispersion of air-fuel mixtures. Also, note that air-fuel mixtures can be sufficiently dispersed during the high-load engine operation by further extending the distance between the first spark plug 37 and the second spark plug 38.

Also, in the fourth embodiment, the spark plugs may be fired by the ECU 40 as in the first embodiment. Namely, they may be fired in order of the first spark plug 37 and the second spark plug 38 during the low-load engine operation and in order of the second spark plug 38 and the first spark plug 37 during the high-load engine operation. With this arrangement, misfires may be avoided during the low-load engine operation, whereby a further stability can be achieved in igniting and combusting air-fuel mixtures, while preventing a reduction in the combustion efficiency during the high-load engine operation.

Figure 20:
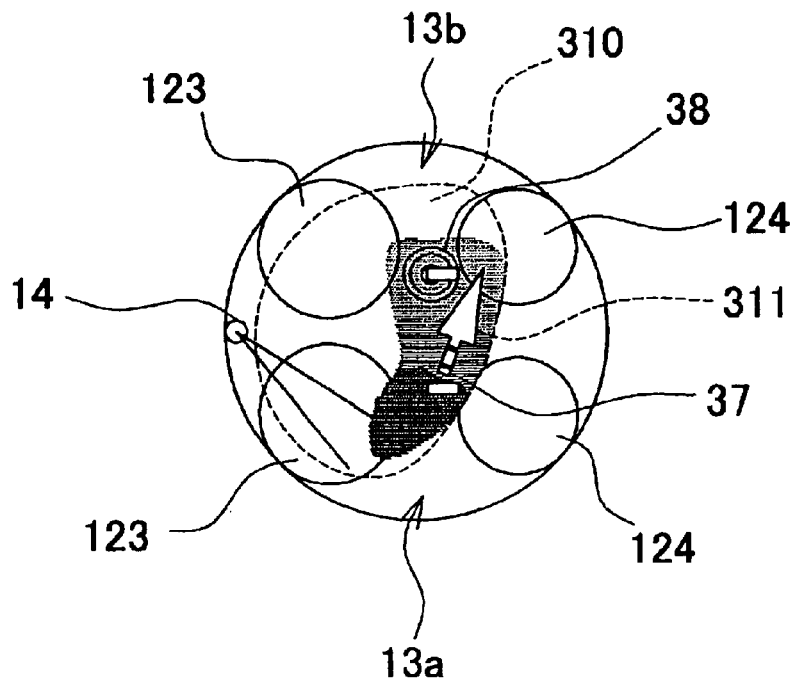
FIG. 20 is a view schematically showing a first modification example of the fourth embodiment of the invention.
Figure 21:
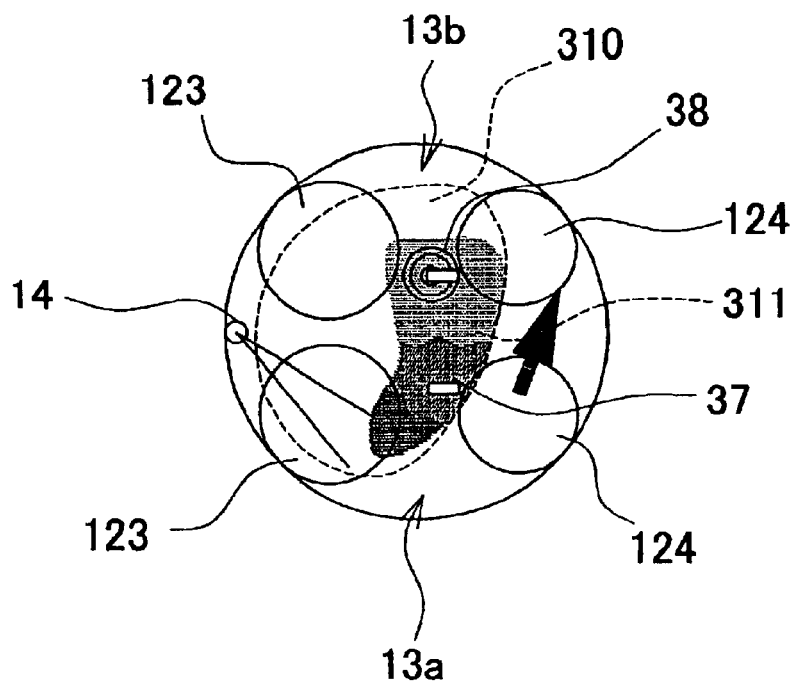
FIG. 21 is a view schematically showing a second modification example of the fourth embodiment of the invention.

Next, modification examples of the direct injection engine 300 of the fourth embodiment will hereinafter be described with reference to FIGS. 20 to 22. First, second, and third modification examples are shown in FIGS. 20, 21, and 22, respectively. In each figure, the cavity 310 is outlined by a dotted line for indicating its position relative to the spark plugs 37, 38 as viewed from the side of the bottom surface of the piston 13.

To begin with, the first modification example will be explained. Referring to FIG. 20, the fuel injection direction of the fuel injection valve 14 is offset to the side of the peripheral area 13a. This arrangement further promotes an air-fuel mixture to move or disperse from the peripheral area 13a to the peripheral area 13b.

Next, the second modification example will be explained with reference to FIG. 21. In this example, additionally, the valves are driven to produce swirl flows. This arrangement still further promotes an air-fuel mixture to move or disperse from the peripheral area 13a to the peripheral area 13b. Especially, an air-fuel mixture can quickly disperse when a large amount of fuel is injected.

Next, the third modification example will be explained. Referring to FIG. 22, the fuel injection angle of the fuel injection valve 14 is set to a wide angle, and a protrusion 312 which impedes the movement of the air-fuel mixture from the peripheral area 13a to the peripheral area 13b is provided on the wall portion 311 of the cavity 310. With this arrangement, an area acting as a concentrating type combustion chamber in which the air-fuel mixture concentrates is established in a potion of the cavity 310 closer to the side of the peripheral area 13a while another area acting as a dispersing type combustion chamber into which the air-fuel mixture disperses is formed in a portion of the cavity 310 closer to the side of the peripheral area 13b. Thus, the first spark plug 37 is fired to ignite the air-fuel mixture in the former area during the low-load engine operation where only a small amount of fuel is injected, while the second spark plug 38 is fired to ignite the air-fuel mixture in the latter area during the high-load engine operation where a large amount of fuel is injected. In this way, the stratified-charge combustion region for the high-load engine operation may be expanded.

(Fifth Embodiment)

Figure 23:
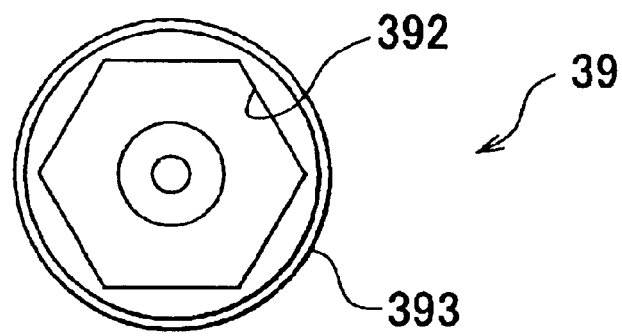
FIG. 23 is a top view of a spark plug of an in-cylinder injection type internal combustion engine according to a fifth embodiment of the invention.
Figure 24:
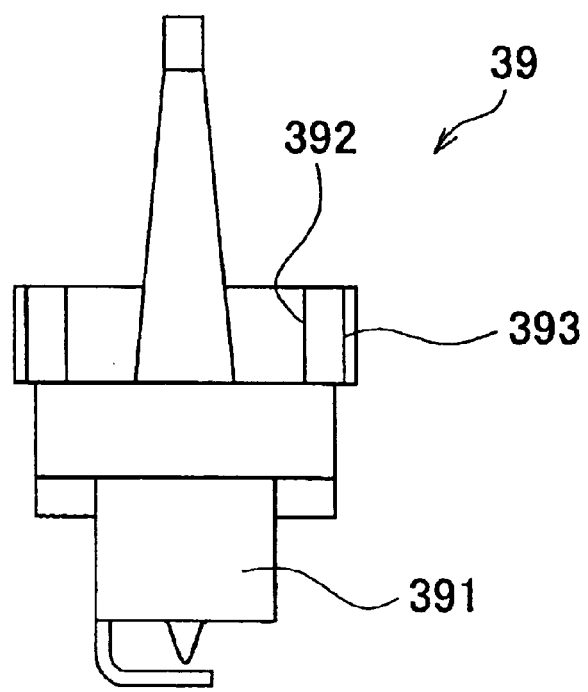
FIG. 24 is a front view of the spark plug of the in-cylinder injection type internal combustion engine according to the fifth embodiment of the invention.
Figure 25:
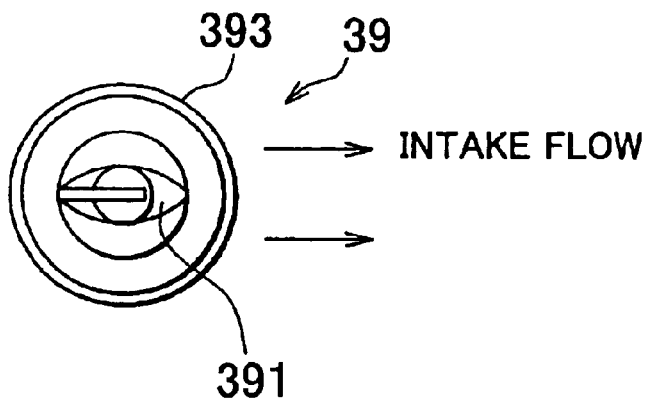
FIG. 25 is a bottom view of the spark plug of the in-cylinder injection type internal combustion engine according to the fifth embodiment of the invention.
Figure 26:
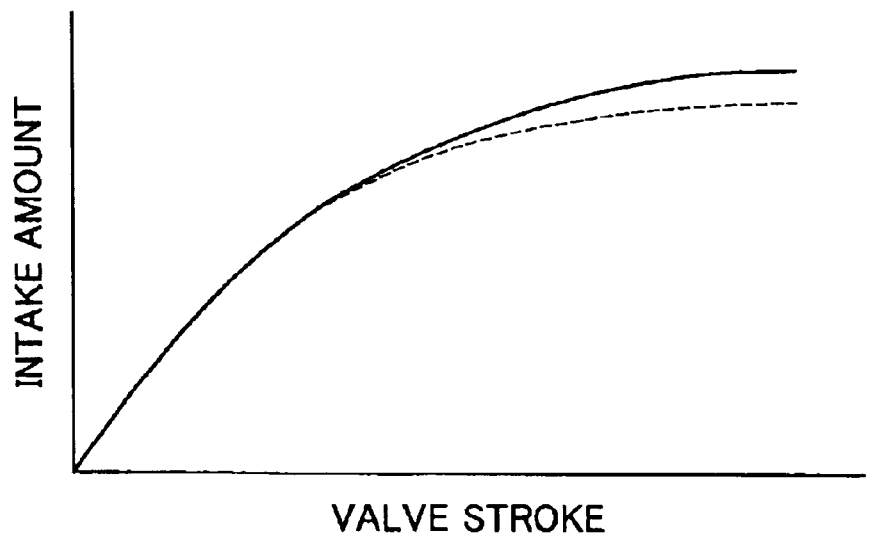
FIG. 26 is a graph for making a comparison of the intake amount between when the spark plug of the in-cylinder injection type internal combustion engine according to the fifth embodiment of the invention is used and when a conventional spark plug is used.

Next, a direct injection engine according to a fifth embodiment of the invention will be described. In the following description, spark plugs used in this embodiment will be mainly explained with reference to FIGS. 23 to 26. FIGS. 23, 24, and 25 show a spark plug 39 in the fifth embodiment as viewed from the top, front and bottom sides thereof, respectively. FIG. 26 is a graph for making a comparison of the intake amount between when the spark plug 39 is used and when a conventional spark plug is used.

Since the spark plug 39 may be used in the direct injection engines 10, 100, 200, and 300 of the first to fourth embodiments described above, the construction of a direct injection engine in which the spark plug 39 may be used will not be explained in the following description.

As mentioned above in the first to fourth embodiments, using a plurality of spark plugs is effective in expanding the stratified-charge combustion region and improving the combustion stability in direct injection engines. However, when a plurality of spark plugs are used, a plurality of electrodes of the plugs are protruded into the combustion chamber, which further disturb an intake air flow. When the intake air flow is disturbed, it reduces the flow rate of the intake air and weakens a tumble flow (a flow in the vertical direction) within the combustion chamber 20, which may hinder fuel and air from being appropriately mixed and may thereby cause a reduction in the combustion efficiency and an increase in the fuel consumption. Meanwhile, although the degree of such a disturbance of an intake air flow may be reduced by using spark plugs having a thinner shape. For assuring a necessary level of strength of insulators, however, the plugs can not be made thin exceeding a certain limit.

In this embodiment, therefore, the spark plug 39 has an insulator 391 which is formed in a streamline shape, and each spark plug 39 is disposed in the cylinder head 12 such that the streamline surfaces of the insulator 391 is oriented along the direction of the intake air flow. Namely, the dimension of the insulator 391 in the major axis direction thereof is substantially equal to that of an insulator of a conventional spark plug, while the dimension of the insulator 391 in the minor axis direction thereof is smaller than that of the same conventional insulator. Formed in such a shape, the insulator 391 has the necessary level of strength while permitting intake air to smoothly flow therethrough. However, for mounting each spark plug in a cylinder head, generally, a housing having a threaded portion at its periphery is fixed to the lower portion of the spark plug, and the spark plug is mounted in the cylinder head via the threaded portion of the housing. In this embodiment, however, the spark plug 39 can not be installed in the cylinder head 12 using such a thread since the insulator 391 having a streamline shape needs to be protruded into the combustion chamber 20 as described above. Therefore, a threaded portion 393 including a hexagon portion 392 is provided in the upper portion of the spark plug 39, and the spark plug 39 is mounted in the cylinder head 12 via the threaded portion 393. Here, by forming a corresponding plug installation hole in a shape matching with the streamline shape of the lower portion of the spark plug 39 in the cylinder head 12, the spark plug 39 can be installed in the cylinder head 12 so that the major axis direction of the spark plug 39 agrees with the direction of the intake air flow.

Next, an effect achieved by using the spark plug 39 will hereinafter be described with reference to FIG. 26. FIG. 26 is a graph showing relationships between the valve stroke amount and the intake amount. In the graph, the sequential line represents a relationship between the valve stroke amount and the intake amount when the spark plug 39 in the fifth embodiment is used, while the dotted line represents the same relationship when a conventional spark plug having a round-shaped insulator is used. As is understood from the graph, when the spark plug 39 is used, a larger amount of intake air can be obtained as the valve stroke amount increases. That is, according to the embodiment, by reducing the intake resistance provided by the protruded portion of the spark plug, a larger amount of intake air can be introduced into the combustion chamber 20, which increases the engine output.

Furthermore, in direct injection engines, it is necessary to provide a combustible portion of an air-fuel mixture around a spark plug during stratified-charge combustion. For this reason, an intake air flow needs to be stabilized so that the combustible portion of the air-fuel mixture can be reliably guided to the periphery of the spark plug. According to the embodiment, with the spark plug 39, the direction of the intake air flow within the combustion chamber 20 is stabilized. As a result, the tumble flow can be intensified and mixing of fuel and intake air can be promoted, thus achieving improved combustion efficiency and fuel economy.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

For example, while two spark plugs are used in the first to fourth embodiments described above, a larger number of spark plugs, such as three, four, or five plugs, may be used. Optionally, a spark plug having a plurality of electrodes may be used. In such a case, by having an appropriate distance between the electrodes, the same effects and advantages as those obtained when a plurality of spark plugs are used can be obtained.

What is claimed is:

1. An in-cylinder injection type internal combustion engine, comprising:
   a cylinder block;
   a cylinder head;
   a piston;
   a combustion chamber defined by the cylinder block, the cylinder head, and the piston;
   a fuel injector for injecting a fuel directly into the combustion chamber, which injects the fuel such that high and low concentration portions of an air-fuel mixture are formed in the combustion chamber during stratified-charge combustion;
   a first ignitor disposed in a portion of the cylinder head corresponding to a high concentration portion;
   a second ignitor disposed in a portion of the cylinder head corresponding to a low concentration portion;
   a load detector for detecting a load required of the in-cylinder injection type internal combustion engine; and
   an ignition controller which advances an ignition time of the first ignitor relative to an ignition time of the second ignitor when a load detected by the load detector is low during stratified-charge combustion.

2. The in-cylinder injection type internal combustion engine according to claim 1, wherein:
   the ignition controller delays the ignition time of the first ignitor relative to the ignition time of the second ignitor when the load detected by the load detector is high during stratified-charge combustion.

3. The in-cylinder injection type internal combustion engine according to claim 1, wherein:
   the fuel injector is disposed at the periphery of the combustion chamber and is adapted to inject a fuel towards a central area of the combustion chamber from the periphery of the combustion chamber such that the high concentration portion of the air-fuel mixture is formed in the central area of the combustion chamber and the low concentration portion of the air-fuel mixture is formed in a peripheral area of the combustion chamber immediately after the fuel has been injected;
   the first ignitor is disposed in a portion of the cylinder head corresponding to the central area of the combustion chamber; and
   the second ignitor is disposed in a portion of the cylinder head corresponding to the peripheral area of the combustion chamber.

4. The in-cylinder injection type internal combustion engine according to claim 3, wherein:
   the combustion chamber has a shape suitable for guiding the air fuel mixture formed of the fuel injected by the fuel injector and moving from the peripheral area to the central area of the combustion chamber to flow from the central area to the peripheral area of the combustion chamber along the cylinder head, and
   the first and second ignitors are arranged within the cylinder head so as to be located in line with the flow of the air-fuel mixture.

5. The in-cylinder injection type internal combustion engine according to claim 1, wherein:
   a cavity is formed on an upper surface of the piston, which guides the air-fuel mixture formed of the fuel injected from the fuel injector and moving from the peripheral area to the central area of the combustion chamber to flow from the peripheral area to the central area of the combustion chamber along the cylinder head;
   the fuel injector is disposed at the periphery of the combustion chamber and is adapted to inject a fuel towards the cavity of the piston;
   the first ignitor is disposed in a portion of the cylinder head facing the cavity of the piston; and
   the second ignitor is disposed in a portion of the cylinder head that is located in the vicinity of the fuel injector.

6. The in-cylinder injection type internal combustion engine according to claim 2, wherein:

the fuel injector is disposed at a periphery of the combustion chamber and is adapted to inject a fuel towards a central area of the combustion chamber from the periphery of the combustion chamber such that the high concentration portion of the air-fuel mixture is formed in the central area of the combustion chamber and the low concentration portion of the air-fuel mixture is formed in a peripheral area of the combustion chamber immediately after the fuel has been injected;

the first ignitor is disposed in a portion of the cylinder head corresponding to the central area of the combustion chamber; and the second ignitor is disposed in a portion of the cylinder head corresponding to the peripheral area of the combustion chamber.

7. The in-cylinder injection type internal combustion engine according to claim 6, wherein:

the combustion chamber has a shape suitable for guiding the air fuel mixture formed of the fuel injected by the fuel injector and moving from the central area to the peripheral area of the combustion chamber to flow from the central area to the peripheral area of the combustion chamber along the cylinder head, and the first and second ignitors are arranged within the cylinder head so as to be located in line with the flow of the air-fuel mixture.

8. The in-cylinder injection type internal combustion engine according to claim 2, wherein:

a cavity is formed on an upper surface of the piston, which guides the air-fuel mixture formed of the fuel injected from the fuel injector and moving from the peripheral area to the central area of the combustion chamber to flow from the peripheral area to the central area of the combustion chamber along the cylinder head;

the fuel injector is disposed at the periphery of the combustion chamber and is adapted to inject a fuel towards the cavity of the piston;

the first ignitor is disposed in a portion of the cylinder facing the cavity of the piston; and the second ignitor is disposed in a portion of the cylinder that is located in the vicinity of the fuel injector.

9. The in-cylinder injection type internal combustion engine according to claim 1, wherein the fuel injector is disposed at a periphery of the combustion chamber;

a cavity is formed on an upper surface of the piston, which guides the air-fuel mixture formed of the fuel injected from the fuel injector and moving from a peripheral area to a central area of the combustion chamber to flow from the peripheral area to the central area of the combustion chamber along the cylinder head;

the first ignitor is disposed in a portion of the cylinder head facing the cavity;

the second ignitor is disposed in a portion of the cylinder head that is located in the vicinity of the fuel injector; and an ignition controller is provided which fires the first and second ignitors at the same time.

10. An ignition control method of an in-cylinder injection type internal combustion engine including;

a combustion chamber defined by a cylinder block, a cylinder head, and a piston;

a fuel injector for injecting a fuel directly into the combustion chamber, which injects the fuel such that high and low concentration portions of an air fuel mixture are formed in the combustion chamber during stratified-charge combustion;

a plurality of ignitors disposed in the cylinder head; and a load detector for detecting a load required of the in-cylinder injection type internal combustion engine, the ignition control method comprising steps of:

determining whether stratified-charge combustion is being performed;

detecting a load required of the in-cylinder injection type internal combustion engine when it is determined that stratified-charge combustion is being performed; and advancing an ignition time of an ignitor located in a portion of the cylinder head corresponding to the high concentration portion of the air-fuel mixture relative to an ignition time of another ignitor located in a portion of the cylinder head corresponding to the low concentration portion of the air-fuel mixture when the load detected by the load detector is low.

11. The ignition control method according to claim 10, further comprising a step of:

delaying the ignition time of the ignitor located in the portion of the cylinder head corresponding to the high concentration portion of the air-fuel mixture relative to the ignition time of the another ignitor located in the portion of the cylinder head corresponding to the low concentration portion of the air-fuel mixture when the load detected by the load detector is high.

* * * * *